(12) United States Patent
Wakimoto

(10) Patent No.: US 8,670,244 B2
(45) Date of Patent: Mar. 11, 2014

(54) ELECTRONIC APPARATUS AND METHOD FOR CONNECTING ELECTRONIC DEVICE

(75) Inventor: Kenichi Wakimoto, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 356 days.

(21) Appl. No.: 13/105,390

(22) Filed: May 11, 2011

(65) Prior Publication Data

US 2011/0279992 A1 Nov. 17, 2011

(30) Foreign Application Priority Data

May 14, 2010 (JP) ................................. 2010-112283

(51) Int. Cl.
*H05K 5/00* (2006.01)
(52) U.S. Cl.
USPC ........................................ 361/755; 455/575.3
(58) Field of Classification Search
USPC ............................. 361/755; 455/575.1–575.4
See application file for complete search history.

(56) References Cited

U.S. PATENT DOCUMENTS

| | | | | |
|---|---|---|---|---|
| 6,373,006 B1 * | 4/2002 | Toki | ............................... | 200/61.7 |
| 7,212,845 B2 * | 5/2007 | Ikeuchi | ........................ | 455/575.3 |
| 7,310,222 B2 * | 12/2007 | Bovio et al. | ............... | 361/679.27 |
| 7,412,271 B2 * | 8/2008 | Cheng | ........................ | 455/575.3 |
| 8,064,970 B2 * | 11/2011 | Gaddy et al. | ............... | 455/575.1 |
| 8,140,144 B2 * | 3/2012 | Dale et al. | ...................... | 600/410 |
| 8,358,513 B2 * | 1/2013 | Kim | .............................. | 361/807 |
| 8,405,978 B2 * | 3/2013 | Okutsu | .................... | 361/679.55 |

FOREIGN PATENT DOCUMENTS

| | | |
|---|---|---|
| JP | 11-327683 | 11/1999 |
| JP | 4098399 B2 | 3/2008 |
| JP | 4098399 B2 | 6/2008 |

* cited by examiner

*Primary Examiner* — Hung S Bui
(74) *Attorney, Agent, or Firm* — Husch Blackwell LLP

(57) ABSTRACT

Electronic devices which are selected by a user are coupled together through a coupler to provide a portable electronic apparatus. At least one of the electronic devices is provided with a pair of first connection terminal groups whose polarities are symmetric with respect to one rotation axis. The coupler is provided with a second connection terminal group. In addition, since the electronic device is detachable from the spindle through the coupler, the electronic device can be coupled to the coupler after the electronic device is reversed by the rotation about one rotation axis. A plurality of electronic devices can be connected to each other through the first connection terminal group and the second connection terminal group of the coupler.

14 Claims, 20 Drawing Sheets

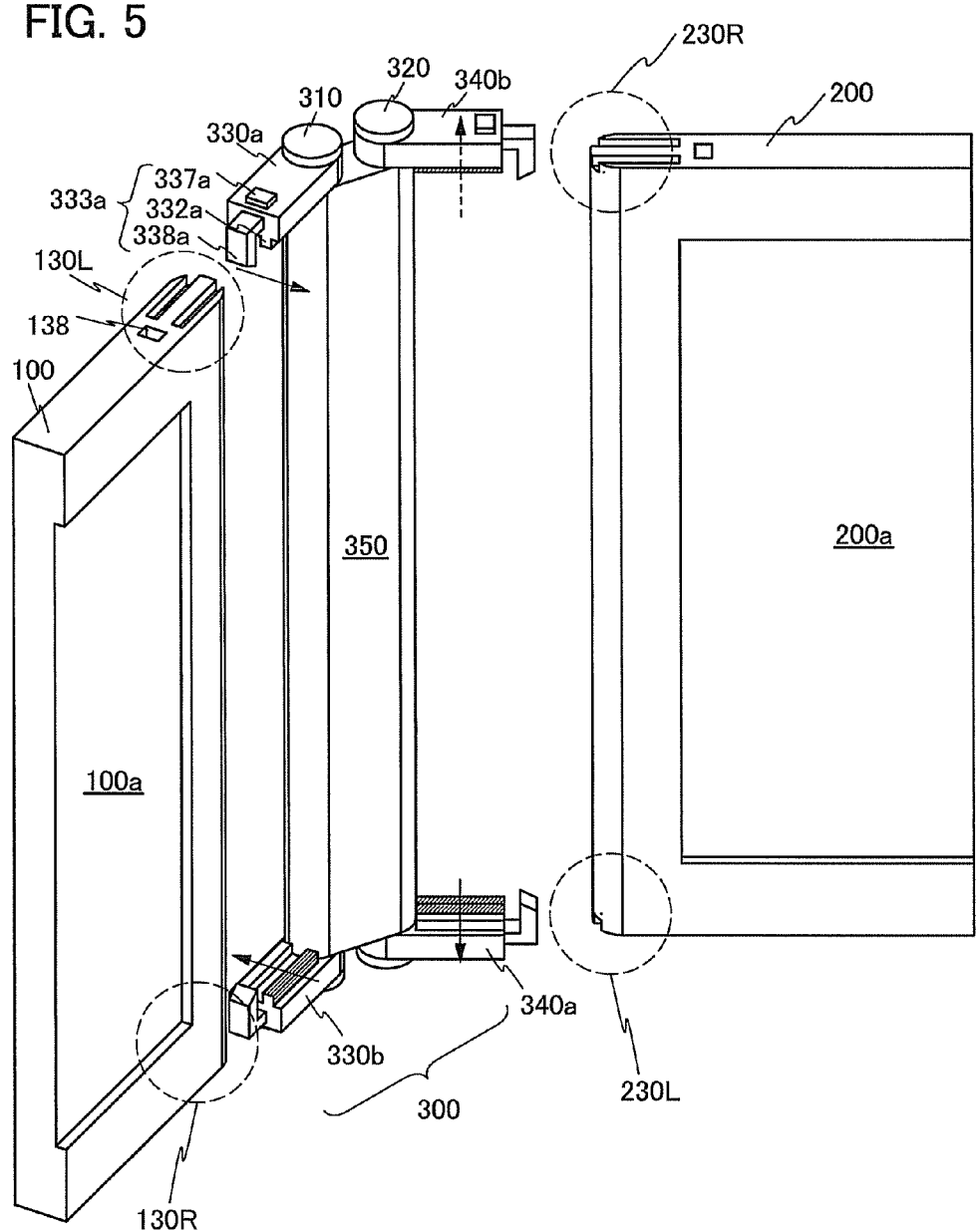

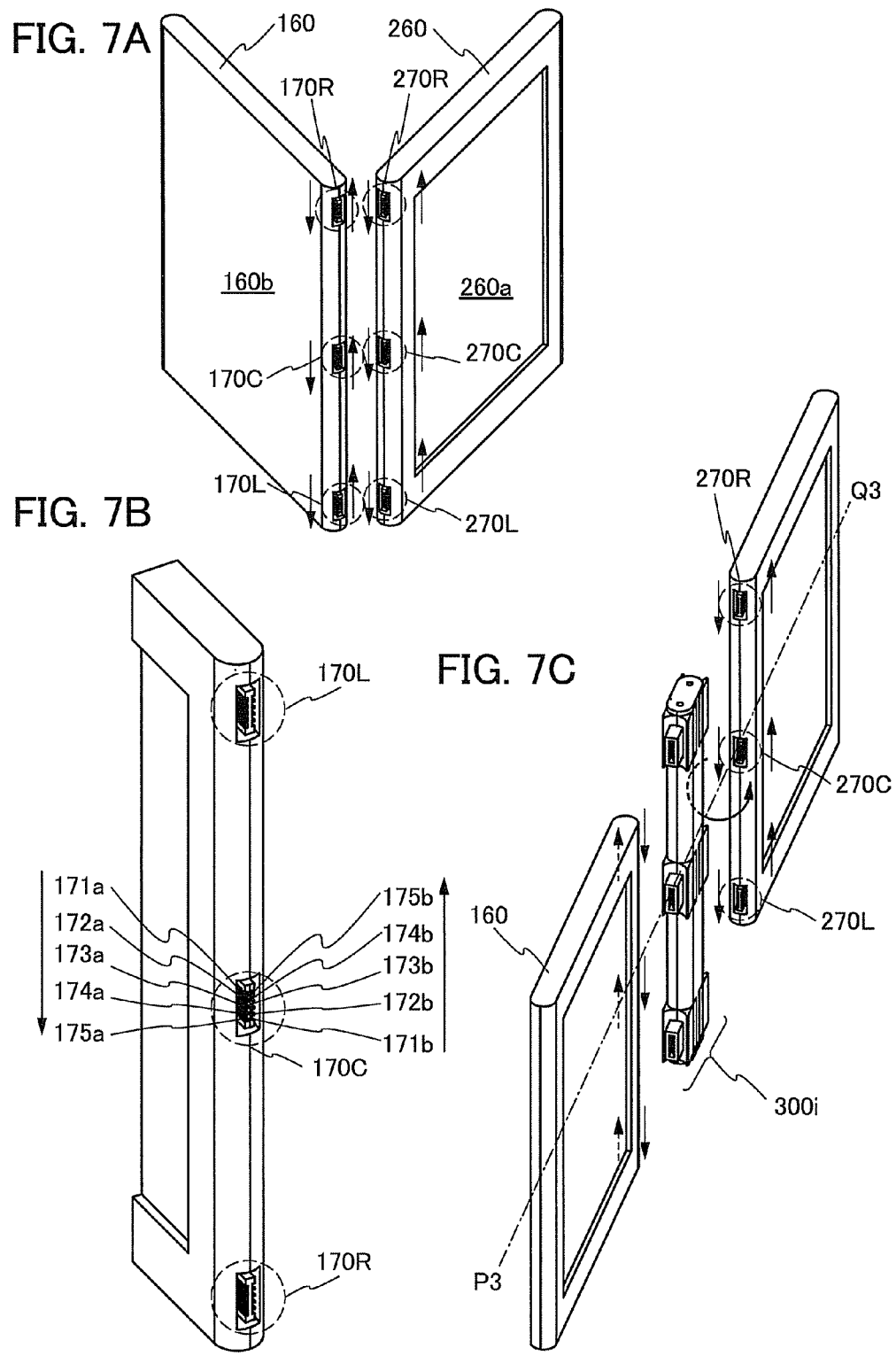

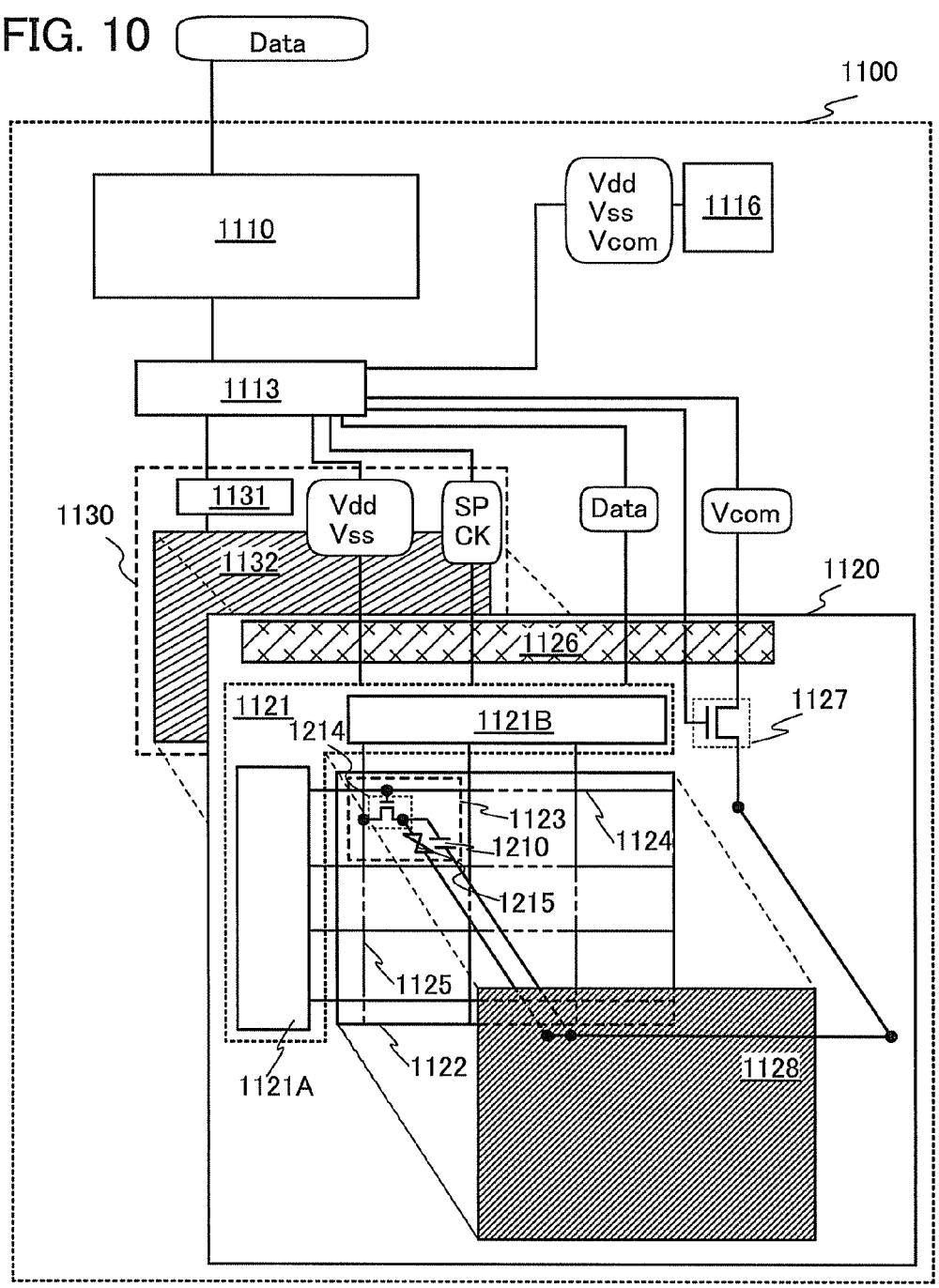

ELECTRONIC APPARATUS AND METHOD FOR CONNECTING ELECTRONIC DEVICE

BACKGROUND OF THE INVENTION

1. Field of the Invention

The present invention relates to an electronic apparatus including a plurality of electronic devices. The present invention also relates to a method for connecting an electronic device.

2. Description of the Related Art

The degree of integration of semiconductor elements has been increased, and the processing ability of arithmetic elements has been improved. Consequently, the size of an electronic apparatus is reduced and the function of the electronic apparatus is increased. Further, the electronic apparatus has become inexpensive. Furthermore, the degree of integration of memory elements and the capacity of the memory elements have been increased. Thus, it has become easy to carry a large amount of data. In addition, a communication infrastructure has been sufficiently developed. As a result, a large amount of data can be handled with the use of a portable electronic apparatus even when a user is away from home.

As an example of a portable electronic apparatus, an information processor capable of folding an operation portion in which operation of information processing is performed and a reproduction display portion and individually separating them is devised (Patent Document 1).

REFERENCE

Patent Document
[Patent Document 1] Japanese Published Patent Application No. H11-327683

SUMMARY OF THE INVENTION

There is a strong tendency for most of electronic apparatuses to be multifunctional in order to improve convenience, and an electronic apparatus in which only a function needed for a user can be selected has not yet been fully realized. For example, a personal computer is an embodiment of an electronic apparatus in which functions which can be achieved by software can be freely selected by a user. However, there are few electronic apparatuses in which functions which can be achieved only by hardware can be freely selected. In particular, in most of small-sized portable electronic apparatuses, functions are selected and combined by a manufacturer. Therefore, a user has to select an electronic apparatus having a function that the user needs among electronic apparatuses provided by a manufacturer, and sometimes the user has to carry a plurality of electronic apparatuses.

In the case where a plurality of electronic apparatuses are carried, the volume and the weight thereof are increased as compared to the case where a single electronic apparatus is carried. In particular, the proportion of the weight of a built-in battery in an electronic apparatus is high. Therefore, it can be said that in the case where a plurality of electronic apparatuses are carried, portability is lost due to the weight of batteries. Further, in the case where a plurality of multi-function electronic apparatuses are carried, parts of the functions overlap, whereby an extra burden is forcibly put on a user.

An electronic apparatus including a battery with a large capacity, a solar battery with a large light-receiving surface, or the like is convenient in the case where it is difficult to receive power from a lamp line. However, such a battery is not needed in the case where it is easy to receive power from a lamp line; if anything, such a battery loses portability of the electronic apparatus. Therefore, it is hard to say that such a battery is convenient. Further, it is preferable that an electronic apparatus including a solar battery be used in a manner that the solar battery is oriented toward a light source; thus, such an electronic apparatus loses the degree of freedom of usage pattern.

Further, even when power is left in a built-in battery of an electronic apparatus which is less frequently used among electronic apparatuses which are carried, the power cannot be used for an electronic apparatus which is more frequently used. As a result, only a battery built into the electronic apparatus which is more frequently used runs down, and thus, the electronic apparatus cannot be used, which is inconvenient.

The present invention is made in view of the foregoing technical background. Thus, an object of the present invention is to provide an electronic apparatus in which electronic devices having functions needed for a user can be selected and combined by the user.

Another object is to provide an electronic apparatus capable of reducing the burden on a user at the time of carrying the electronic apparatus.

In order to achieve the objects, in the present invention, attention is focused on a method in which a plurality of electronic devices separated for each function are used by being freely combined as needed.

Specifically, an electronic apparatus may be used in which a plurality of electronic devices are coupled together through a coupler so as to be rotatable about a spindle and detachable from the spindle. At least one of electronic devices of the electronic apparatus is provided with a pair of first connection terminal groups whose polarities are symmetric with respect to one rotation axis. In addition, since the electronic device is detachable from the spindle through the coupler, the electronic device can be coupled to the coupler after the electronic device is reversed by the rotation about one rotation axis. A plurality of electronic devices can be connected to each other through the first connection terminal group and the second connection terminal group of the coupler.

That is, an embodiment of the present invention is an electronic apparatus including a first electronic device which is detachably held by a coupler fixed to a freely rotatable first spindle; a second electronic device which is detachably held by a coupler fixed to a freely rotatable second spindle; and a holder by which the first spindle and the second spindle are held. In addition, the first electronic device includes a pair of first connection terminal groups whose polarities are symmetric with respect to one rotation axis, and the second electronic device includes a pair of first connection terminal groups whose polarities are symmetric with respect to one rotation axis. Further, the coupler includes a second connection terminal group connected to one of the first connection terminal groups, and the first electronic device and the second electronic device are electrically connected to each other through the first connection terminal group and the second connection terminal group.

With the above-described structure, a user can select and carry an electronic device having a function needed for the user. The electronic apparatus in which electronic devices needed for the user are selected and combined does not have unnecessary structure. Therefore, the electronic apparatus is reduced in weight and volume and thus preferable for being carried. Further, the user can use the electronic apparatus with the orientation of a first surface of the first electronic device and the orientation of a first surface of the second electronic device freely changed, which is convenient.

The number of spindles is not limited to two. Three or more spindles can be held by a holder. By increasing the number of spindles, the number of electronic devices which are combined together can be increased.

Another embodiment of the present invention is an electronic apparatus including a first electronic device which is detachably held by a coupler fixed to a freely rotatable spindle; and a second electronic device which is detachably held by a coupler fixed to the spindle. In addition, the first electronic device includes a pair of first connection terminal groups whose polarities are symmetric with respect to one rotation axis, and the second electronic device includes another pair of first connection terminal groups whose polarities are symmetric with respect to one rotation axis. Further, the coupler includes a second connection terminal group connected to one of the first connection terminal groups, and the first electronic device and the second electronic device are electrically connected to each other through the first connection terminal group and the second connection terminal group.

With the above-described structure, a user can select and carry an electronic device having a function needed for the user. The electronic apparatus in which electronic devices needed for the user are selected and combined together does not have unnecessary structure. Therefore, the electronic apparatus is reduced in weight and volume and thus preferable for being carried. Further, the user can use the electronic apparatus with the orientation of a first surface of the first electronic device and the orientation of a first surface of the second electronic device freely changed, which is convenient.

Further, each of the electronic devices is detachable from the coupler. Therefore, the electronic devices can be used in various combinations, and thus, the user can use the electronic apparatus with high convenience. Furthermore, since the electronic devices can be individually used after being detached from the coupler, high portability is offered.

Another embodiment of the present invention is an electronic apparatus including a first electronic device which is detachably held by a coupler fixed to a freely rotatable first spindle; a second electronic device which is held by a coupler fixed to a freely rotatable second spindle; and a holder by which the first spindle and the second spindle are held. In addition, the first electronic device includes a pair of first connection terminal groups whose polarities are symmetric with respect to one rotation axis, and the coupler includes a second connection terminal group connected to one of the first connection terminal groups. Further, the first electronic device and the second electronic device are electrically connected to each other through the first connection terminal group and the second connection terminal group.

With the above-described structure, a user can select and carry an electronic device having a function needed for the user. The electronic apparatus in which electronic devices needed for the user are selected and combined does not have unnecessary structure. Therefore, the electronic apparatus is reduced in weight and volume and thus preferable for being carried. Further, the user can use the electronic apparatus with the orientation of a first surface of the first electronic device freely changed, which is convenient.

With the structure in which the first spindle and the second spindle are separated, electronic devices with various thicknesses can be used in combination.

Another embodiment of the present invention is an electronic apparatus including a first electronic device which is detachably held by a coupler fixed to a freely rotatable spindle; and a second electronic device which is held by a coupler fixed to the spindle. In addition, the first electronic device includes a pair of first connection terminal groups whose polarities are symmetric with respect to one rotation axis, and the coupler includes a second connection terminal group which is electrically connected to the first electronic device. Further, the first electronic device and the second electronic device are electrically connected to each other through the first connection terminal group and the second connection terminal group.

With the above-described structure, a user can select and carry an electronic device having a function needed for the user. The electronic apparatus in which electronic devices needed for the user are selected and combined does not have unnecessary structure. Therefore, the electronic apparatus is reduced in weight and volume and thus preferable for being carried. Further, the user can use the electronic apparatus with the orientation of a first surface of the first electronic device freely changed, which is convenient.

Another embodiment of the present invention is the electronic apparatus in which power is supplied from one of the electronic devices to the other electronic device through the first connection terminal group and the second connection terminal group.

With the above-described structure, power stored in the electronic devices can be shared.

Another embodiment of the present invention is the electronic apparatus in which power is supplied from one of the electronic devices which is provided with a solar battery, to the other electronic device through the first connection terminal group and the second connection terminal group.

With the above-described structure, the solar battery can be selectively detached by a user, and the orientation of a light-receiving surface of the solar battery can be selected and connected. For example, the orientation of a first surface of the electronic apparatus and the orientation of the light-receiving surface of the solar battery can be freely selected by the user regardless of usage pattern such as an open state or a folding state. As a result, the solar battery can be oriented toward a light source regardless of whether the electronic apparatus is in use or not, which is preferable for power generation.

Another embodiment of the present invention is a method of use of the electronic apparatus provided with the first electronic device and the second electronic device detachably coupled through the coupler to the first spindle and the second spindle which are rotatably held by the holder, in which first surfaces of the first electronic device and the second electronic device in an open state are oriented toward a user.

According to the above-described method of use, the first surface of the first electronic device and the first surface of the second electronic device can be oriented toward a user side and used, which is convenient.

Further, the first electronic device and the second electronic device are made to rotate about the first spindle and the second spindle, and the electronic apparatus is folded with the first surfaces facing each other, whereby the first surfaces can be protected.

Another embodiment of the present invention is a method of use of the electronic apparatus provided with the first electronic device and the second electronic device detachably coupled through the coupler to the first spindle and the second spindle which are rotatably held by the holder, in which a first surface of one of the electronic devices is covered with the other electronic device and a first surface of the other electronic device is oriented toward a user.

According to the above-described method of use, the first surface of one of the electronic devices can be protected by being covered with the other electronic device.

In this specification, in a plurality of surfaces of an electronic device, a surface which is mainly used for operation, observation, input, and the like by a user, or a surface which is mainly used for receiving light, receiving a signal, displaying, and the like by the device is referred to as a first surface of the electronic device, and a surface which is located on the rear surface of the first surface is referred to as a second surface. If it is impossible to limit a surface which is mainly used for operation, observation, input, and the like by a user, or a surface which is mainly used for receiving light, receiving a signal, displaying, and the like by the device to one surface, one of the surfaces is arbitrarily referred to as a first surface, and a surface located on the rear surface of the first surface is referred to as a second surface.

According to the present invention, an electronic apparatus can be provided in which electronic devices having functions needed for a user can be selected, combined together, and carried.

An electronic apparatus capable of reducing the burden on a user at the time of carrying can be provided.

BRIEF DESCRIPTION OF THE DRAWINGS

FIG. 5 illustrates structures of an electronic device and a base unit in accordance with an embodiment.

FIGS. 7A to 7C illustrate a structure of an electronic apparatus in accordance with an embodiment.

FIG. 10 is a block diagram illustrating components of a liquid crystal display device in accordance with an embodiment.

DETAILED DESCRIPTION OF THE INVENTION

Figure 1A:
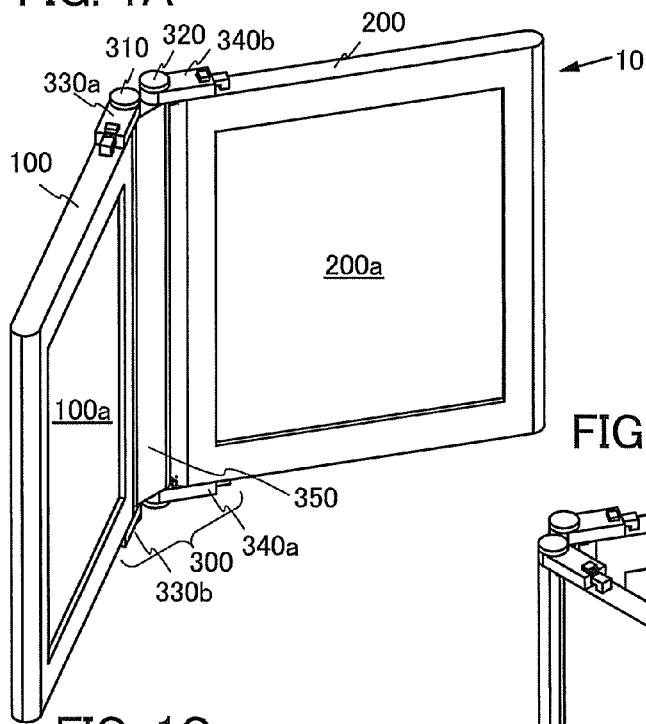
FIGS. 1A to 1C illustrate a structure of an electronic apparatus in accordance with an embodiment.

Embodiments will be described in detail with reference to drawings. Note that the present invention is not limited to the following description, and it will be easily understood by those skilled in the art that various changes and modifications can be made without departing from the spirit and scope of the invention. Therefore, the present invention should not be construed as being limited to the description in the following embodiments. Note that in the structures of the present invention described below, the same portions or portions having similar functions are denoted by the same reference numerals in different drawings, and description of such portions is not repeated.

(Embodiment 1)

In this embodiment, an electronic apparatus which is an embodiment of the present invention is described with reference to FIGS. 1A to 1C, FIGS. 2A to 2C, FIGS. 3A to 3C, FIG. 4, FIG. 5, FIGS. 6A to 6C, FIGS. 7A to 7C, FIGS. 8A and 8B, FIGS. 16A and 16B, FIGS. 17A and 17B, FIG. 18, FIG. 19, and FIG. 20. Specifically described is a structure of an electronic apparatus in which a plurality of electronic devices are coupled together through a coupler so as to be rotatable about a spindle and detachable from the spindle. At least one of electronic devices of the electronic apparatus is provided with a pair of first connection terminal groups whose polarities are symmetric with respect to one rotation axis. In addition, since the electronic device is detachable from the spindle through the coupler, the electronic device can be coupled to the coupler after the electronic device is reversed by the rotation about one rotation axis. A plurality of electronic devices can be connected to each other through the first connection terminal group and the second connection terminal group of the coupler.

An electronic apparatus 10 illustrated in this embodiment includes a first electronic device 100, a second electronic device 200, and a base unit 300. FIGS. 1A to 1C and FIGS. 2A to 2C are perspective views of the electronic apparatus 10.

The first electronic device 100 and the second electronic device 200 are held by a first spindle 310 of the base unit 300 and a second spindle 320 of the base unit 300, respectively, so as to be freely rotated. Further, the first electronic device 100 is detachably fixed to the first spindle 310 through a pair of couplers 330a and 330b, and the second electronic device 200 is detachably fixed to the second spindle 320 through a pair of couplers 340a and 340b. Note that the first electronic device 100 and the second electronic device 200 are electrically connected to each other through the base unit 300.

Figure 3A:
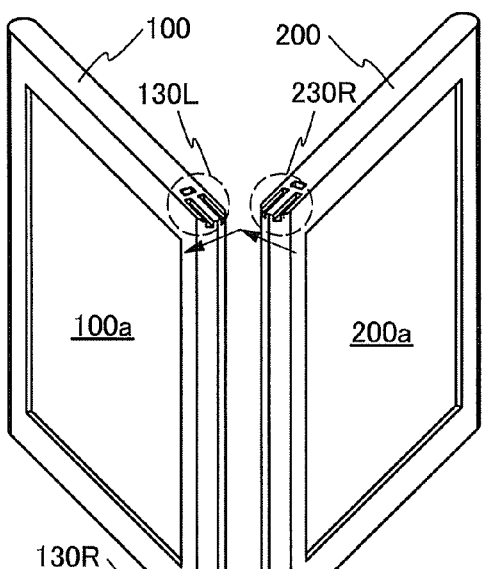
FIGS. 3A to 3C illustrate a structure of an electronic apparatus in accordance with an embodiment.

The structure of the first electronic device 100 and the second electronic device 200 is described. FIG. 3A is a perspective view of the structure. The first electronic device 100 includes a first surface 100a, a second surface 100b which is located on the rear surface of the first surface 100a and not shown, and a pair of first connection terminal groups 130L and 130R. The second electronic device 200 includes a first surface 200a, a second surface 200b which is located on the rear surface of the first surface 200a and not shown, and a pair of first connection terminal groups 230L and 230R.

The first electronic device 100 and the second electronic device 200 are electronic devices which can be operated individually. Examples of electronic devices which can be operated individually include a storage device having a display function; a power source device provided with a solar battery and a secondary battery; an input device; a display device having an input function; an arithmetic device having an input function; a display device; and the like.

The first connection terminal group 130L is provided with at least terminals with different polarities. The electronic device which is an embodiment of the present invention outputs power or an electric signal to the terminals with different polarities as a potential difference, or the electronic device which is an embodiment of the present invention inputs power or an electric signal to the terminals with different polarities as a potential difference. For example, in the case where the electronic device is a direct current power source device provided with a solar battery and a secondary battery which stores power generated by the solar battery, the electronic device outputs direct current to the terminals with different polarities (an anode and a cathode). In the case where the electronic device is a display device which is operated with direct current power, direct current power is input from the terminals with different polarities (an anode and a cathode), so that the electronic device is operated. Note that current which is output or input from an electronic device is not limited to direct current. In the case where an electronic device outputs or inputs alternating current, the polarities may be reversed.

An example of the structure of the first connection terminal group 130L is described with reference to a perspective view shown in FIG. 3B. The first connection terminal group 130L includes a terminal 131L having a depression, a terminal 132L having a depression, and a first fitting portion 138. Note that the first connection terminal group 130L, the first connection terminal group 130R, the first connection terminal group 230L, and the first connection terminal group 230R have the same structure.

The first connection terminal group 130L has terminals with different polarities. The first electronic device 100 outputs different potentials to the terminals 131L and 132L, or different potentials are input from the terminals 131L and 132L to the first electronic device 100. In FIGS. 3A to 3C, the polarities of the first connection terminal group 130L are indicated by an arrow pointing from the potential of the terminal 131L to the potential of the terminal 132L. Note that arrows on the sides of the first connection terminal group 130L, the first connection terminal group 130R, the first connection terminal group 230L, and the first connection terminal group 230R in FIGS. 3A to 3C are arrows each pointing from a terminal having the same potential as the terminal 131L to a terminal having the same potential as the terminal 132L. Further, in the first electronic device 100, the terminals 131L and 131R are connected to each other, and the terminals 132L and 132R are connected to each other. In the case where the electronic device outputs or inputs alternating current, the polarities may be reversed; however, the symmetry of the arranged terminals with respect to one rotation axis is not broken.

For example, a low potential is supplied from the second electronic device 200 to one of the terminals, i.e., the terminal 131L, in the first connection terminal group in the first electronic device 100, and a high potential is supplied to the other terminal, i.e., the terminal 132L; thus, power or a signal can be supplied from the second electronic device 200 to the first electronic device 100.

Figure 3B:
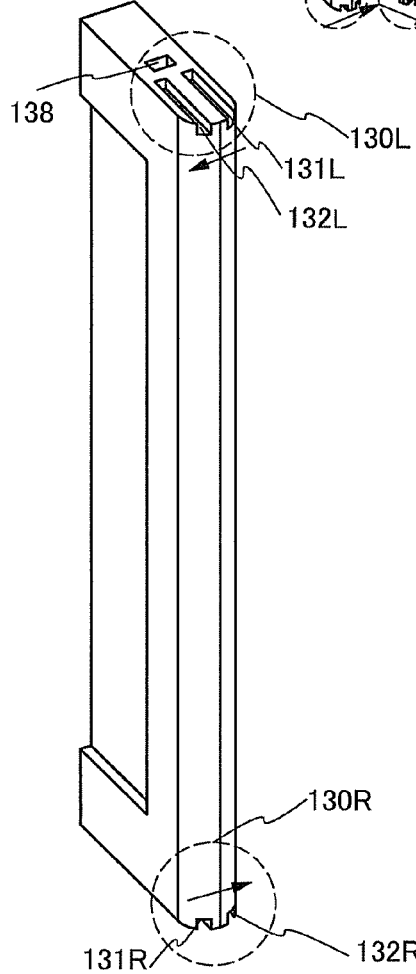
Figure 3C:
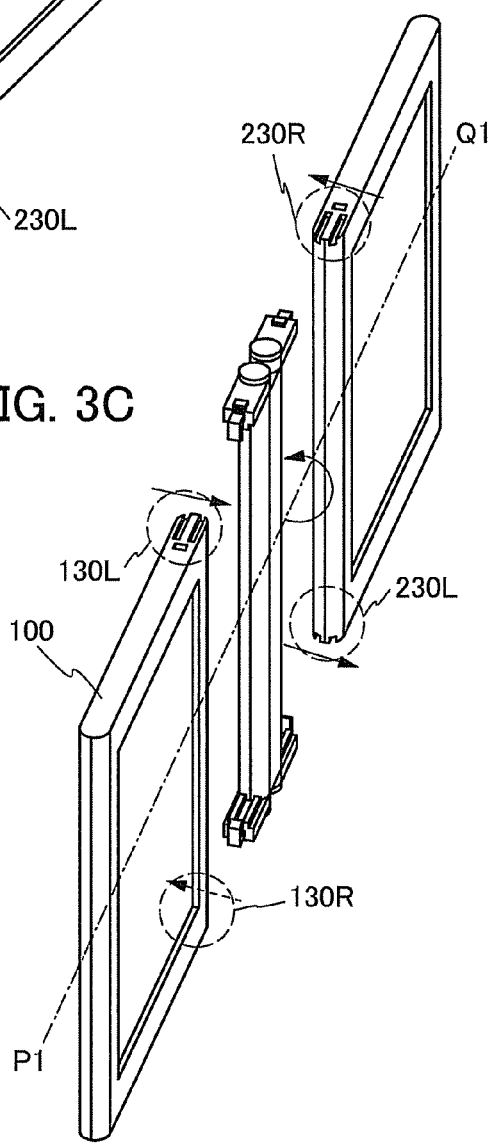

Arrows on the sides of the first connection terminal groups in FIGS. 3A to 3C indicate the polarities of the first connection terminal groups. At least one of electronic devices in an embodiment of the present invention includes a pair of first connection terminal groups whose polarities are symmetric with respect to one rotation axis. Specifically, as indicated by arrows in FIG. 3C, the polarities are symmetric with respect to one rotation axis P1-Q1.

The first connection terminal group 130L illustrated in this embodiment can be detachably coupled to the coupler 330a of the base unit 300. The terminals of the first connection terminal groups 130L and 130R illustrated in this embodiment are arranged so that the polarities thereof are symmetric with respect to one rotation axis P1-Q1. Thus, the first electronic device 100 can be reversed by the rotation about one rotation axis P1-Q1 and connected to the base unit. Note that here, "coupling" not only means electrical connection but also means mechanical connection. For example, as for the first connection terminal group 130L illustrated in this embodiment, the coupler 330a having a projection is coupled to the first connection terminal group 130L having a depression by being fitted into the first connection terminal group 130L having a depression.

Further, in the case where the first electronic device 100 and the second electronic device 200 in the electronic apparatus 10 each have an independent built-in power source, the power source may be shared by the devices through the base unit. For example, the first electronic device 100 may use the built-in power source for itself, and further, the electronic device 100 may output power to the first connection terminal group 130L. Specifically, the first connection terminal group 130L is electrically connected to the second connection terminal group of the coupler of the base unit, whereby the first electronic device 100 can output power to the second connection terminal group of another coupler. In that case, when the first connection terminal group 230R of the second electronic device 200 is coupled to the other coupler, power can be output from the first electronic device 100 to the second electronic device 200 through the first connection terminal group 230R. Further, power can be supplied from the second electronic device 200 to the first electronic device 100 in a similar manner.

With such a structure, power sources of a plurality of electronic devices can be shared. For example, when a battery of an electronic device which is more frequently used among a plurality of electronic devices runs down, the electronic device can use a battery of another electronic device which is less frequently used. Thus, such a structure is convenient.

Figure 4:
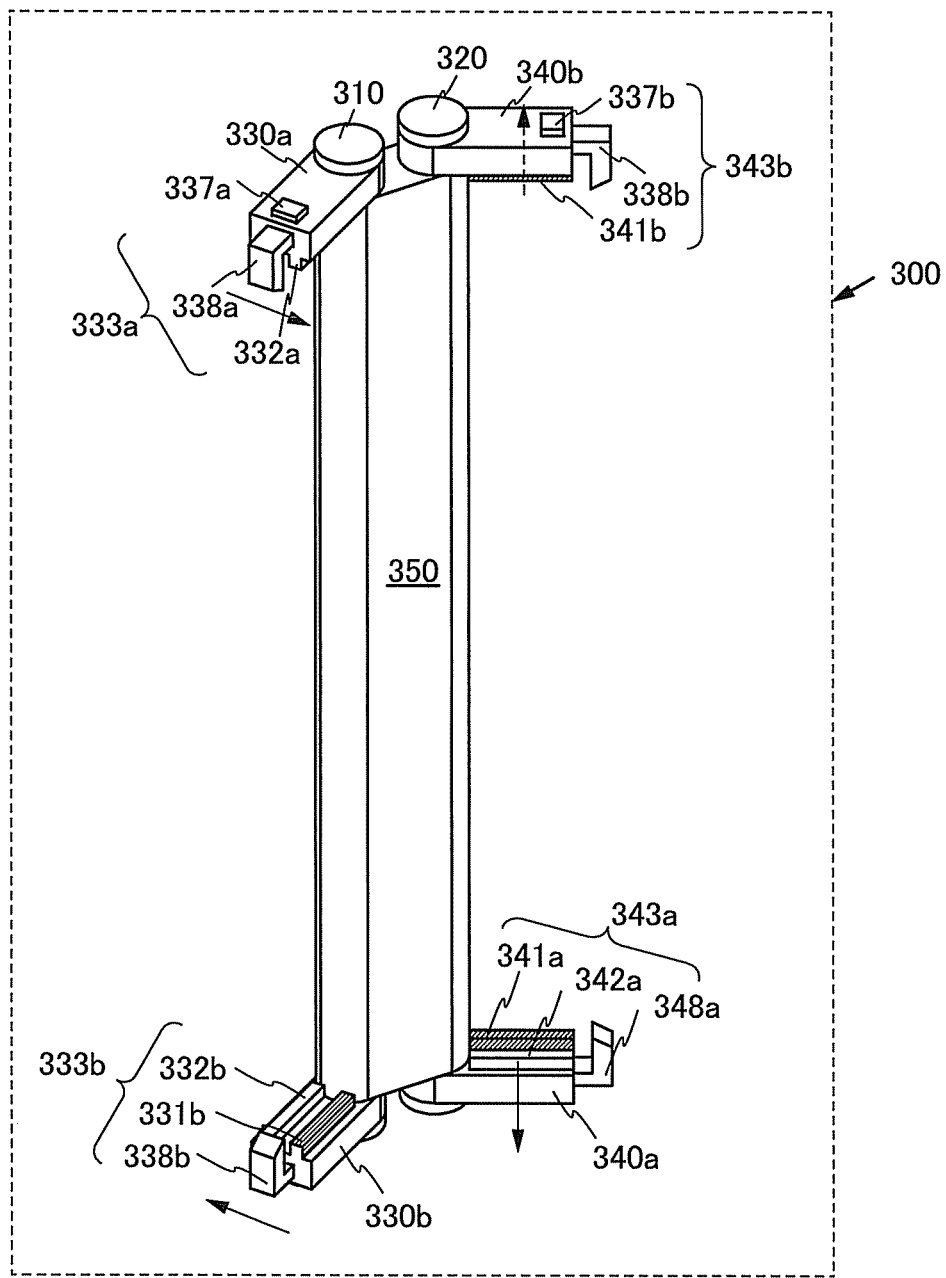
FIG. 4 illustrates a structure of a base unit in accordance with an embodiment.

The structure of the base unit 300 is described. FIG. 4 is a perspective view of the structure of the base unit 300. The base unit 300 includes the first spindle 310, the second spindle 320, a holder 350, the pair of couplers 330a and 330b, and the pair of couplers 340a and 340b.

Figure 16A:
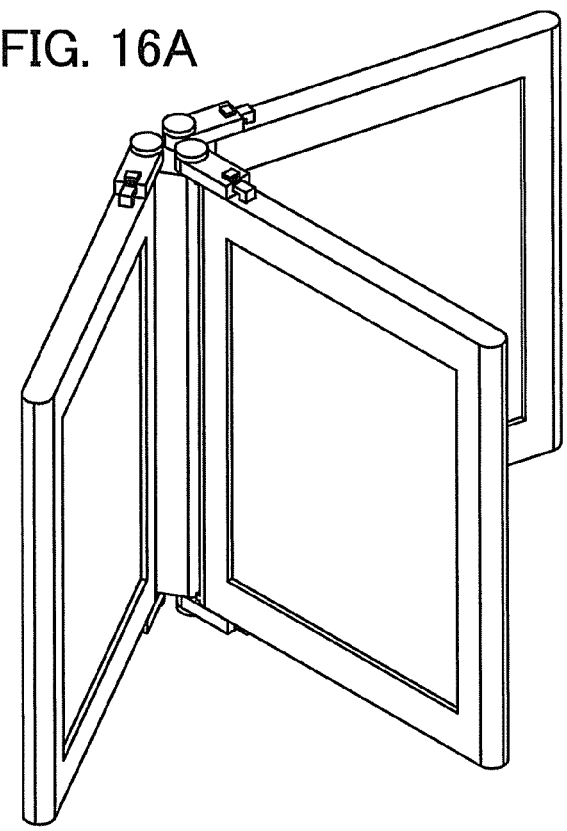
FIGS. 16A and 16B each illustrate a structure of an electronic apparatus in accordance with an embodiment.
Figure 16B:
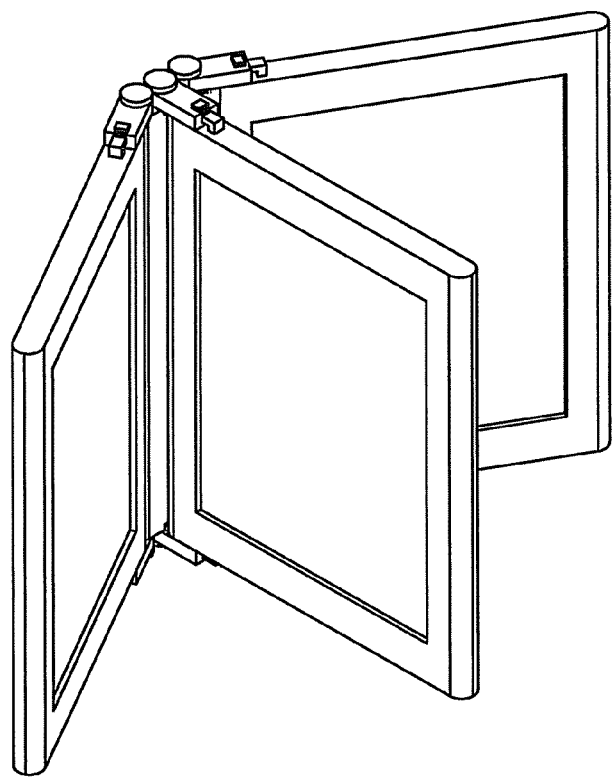

The holder 350 holds the first spindle 310 and the second spindle 320 so that the first spindle 310 and the second spindle 320 are freely rotated. In this embodiment, the holder 350 holds two spindles; however, the present invention is not limited thereto. The holder 350 may hold three or more spindles. FIGS. 16A and 16B illustrate the case where a holder holds three spindles. When the number of spindles held is increased, the number of electronic devices which can be coupled together can be increased.

Note that the number of electronic devices which can be coupled together is not limited to the number of spindles held. For example, a structure may be provided which includes a first electronic device which is detachably held by one coupler fixed by one spindle which is freely rotatable, and a second electronic device which is detachably held by another coupler fixed by the spindle. In addition to this structure, the first electronic device includes a pair of first connection terminal groups whose polarities are symmetric with respect to one rotation axis, and the second electronic device includes another pair of first connection terminal groups whose polarities are symmetric with respect to one rotation axis. Further, the coupler includes a second connection terminal group connected to a first connection terminal group, and the first electronic device and the second electronic device are electrically connected to each other through the first connection terminal group and the second connection terminal group. Such an electronic apparatus is an embodiment of the present invention.

Figure 17A:
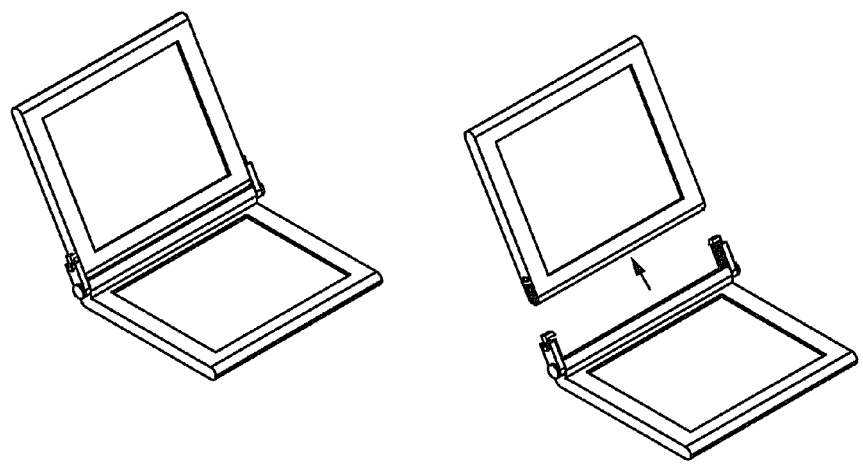
FIGS. 17A and 17B each illustrate a structure of an electronic apparatus in accordance with an embodiment.
Figure 17B:
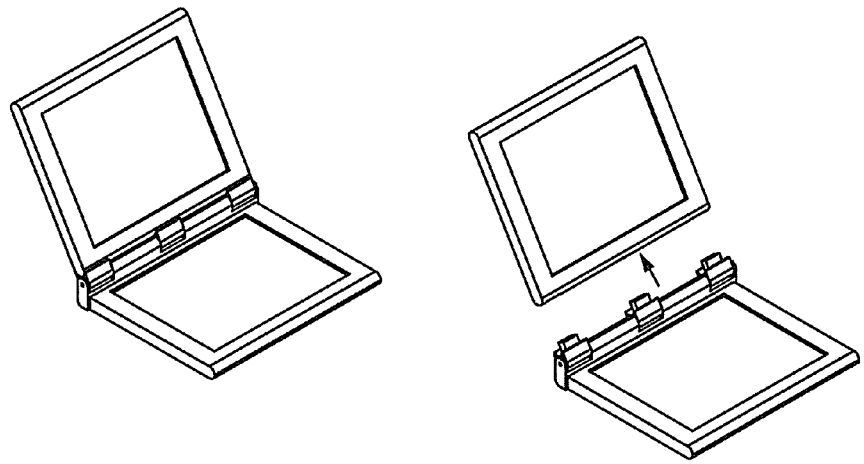

Further, a base unit may be included in an electronic device. FIGS. 17A and 17B show an example of an electronic apparatus in which one electronic device provided with a base unit is coupled to another electronic device. Note that in the electronic apparatus of FIG. 17A, coupling is performed by a coupling method similar to the coupling method of the first connection terminal group to the coupler shown in FIGS. 3A to 3C, and in the electronic apparatus of FIG. 17B, coupling is performed by a coupling method similar to the coupling method of the first connection terminal group to the coupler shown in FIGS. 7A to 7C.

The structure of the coupler 330b is described with reference to FIG. 4. The coupler 330b includes a second connection terminal group 333b. The second connection terminal group 333b includes at least terminals with different polarities. For example, the second connection terminal group 333b illustrated in this embodiment includes a terminal 331b and a terminal 332b. Further, the second connection terminal group 333b includes a second fitting portion 338b.

All of the couplers 330a, 330b, 340a, and 340b have the same structure. Since the pair of couplers 330a and 330b is fixed to the first spindle 310 with the couplers 330a and 330b facing each other, the second connection terminal groups provided in the couplers 330a and 330b are provided with terminals in a manner that terminals with the same polarity are symmetric with respect to one rotation axis. Further, since the pair of couplers 340a and 340b is fixed to the second spindle 320 with the couplers 340a and 340b facing each other, the second connection terminal groups provided in the couplers 340a and 340b are provided with terminals in a mariner that terminals with the same polarity are symmetric with respect to one rotation axis.

In this embodiment, as for terminals included in each of the second connection terminal group 333a, the second connection terminal group 333b, the second connection terminal group 343a, and the second connection terminal group 343b, terminals with the same polarity are electrically connected to each other and have the same potential. Specifically, a terminal 332a of the second connection terminal group 333a, the terminal 332b of the second connection terminal group 333b, a terminal 342a of the second connection terminal group 343a, and a terminal of the second connection terminal group 343b, which is not shown, are connected to each other and have the same potential. Further, a terminal of the second connection terminal group 333a, which is not shown, the terminal 331b of the second connection terminal group 333b, a terminal 341a of the second connection terminal group 343a, and a terminal 341b of the second connection terminal group 343b are connected to each other and have the same potential.

A method for coupling the first electronic device 100 and the second electronic device 200 to the base unit 300 is described with reference to FIG. 5. Note that described below is a method for coupling the first connection terminal group 130L provided in the first electronic device 100 to the coupler 330a provided in the base unit 300. However, a similar coupling method may be used for other coupling portions.

The first connection terminal group 130L of the first electronic device 100 illustrated in this embodiment includes a depression, and the coupler 330a of the base unit 300 includes a projection. The depression and the projection are fitted together, so that the first electronic device 100 and the base unit 300 are coupled together. Note that the first electronic device 100 is fixed to the first spindle 310 in a manner such that a second fitting portion 338a of the second connection terminal group 333a is fitted into the first fitting portion 138 of the first connection terminal group 130L. Further, by the press of a releasing mechanism 337a, the second fitting portion 338a is released from the first fitting portion 138. In this manner, the first electronic device 100 can be detached from the coupler 330a.

When the electronic apparatus 10 illustrated in this embodiment is used, the orientations of the first electronic device 100 and the second electronic device 200 fixed to the base unit 300 can be freely changed.

For example, in FIG. 1A, the first electronic device 100 and the second electronic device 200 are in an open state with the base unit 300 therebetween, i.e., the first surface 100a of the first electronic device 100 and the first surface 200a of the second electronic device 200 are facing in one direction with the base unit 300 centered.

When the first surfaces of the two electronic devices are in an open state with the base unit 300 therebetween, that is, when the first surfaces of the two electronic devices are facing in one direction, the electronic device can be used from one direction, which is convenient. For example, in the case where the first electronic device 100 and the second electronic device 200 are both display devices, when the electronic apparatus 10 illustrated in this embodiment is used in an open state, a display screen is doubled. Thus, information which can be displayed is doubled.

Figure 1B:
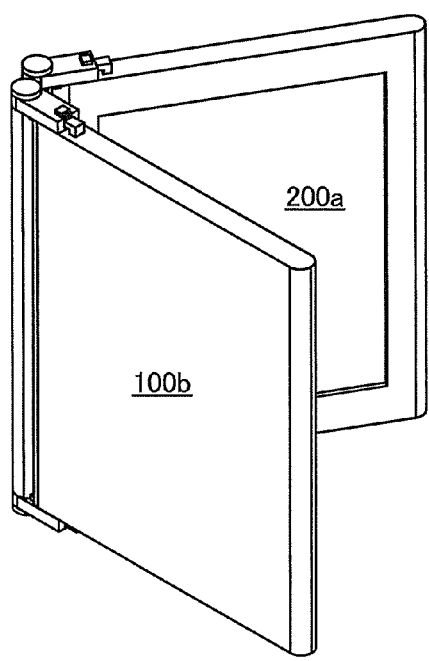

Further, as illustrated in FIG. 1B, the electronic apparatus 10 can be folded along the base unit 300 with the first surfaces of the first electronic device 100 and the second electronic device 200 placed inwardly.

When the electronic apparatus is folded in this manner, the first surfaces of the first electronic device 100 and the second electronic device 200 can be protected by the housings of the first electronic device 100 and the second electronic device 200. Thus, the first surfaces can be protected against damage due to carelessness, and unintended operation can be prevented.

Figure 1C:
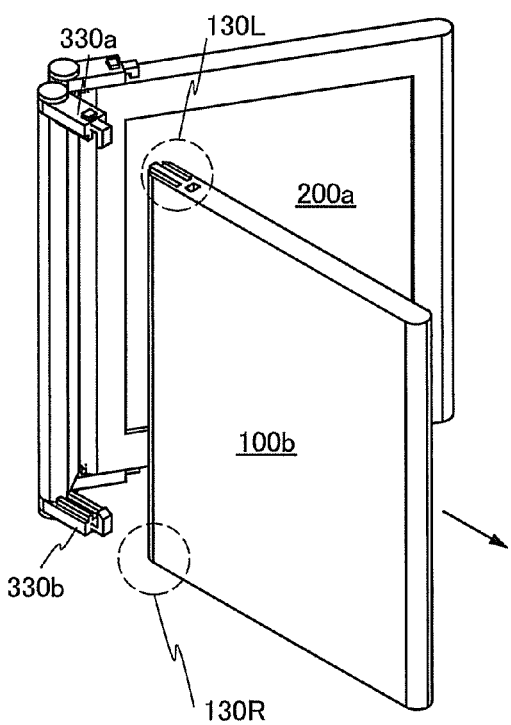

Further, the first electronic device 100 and the second electronic device 200 are electronic devices which can be operated individually. Thus, as illustrated in FIG. 1C, the first electronic device 100 can be separated from the pair of couplers 330a and 330b and used.

An electronic device having a function needed for a user can be selected, and the selected device can be separated from the base unit 300 and used. Thus, the weight and the volume at the time of carrying are reduced, so that the burden on the user can be reduced.

Figure 2A:
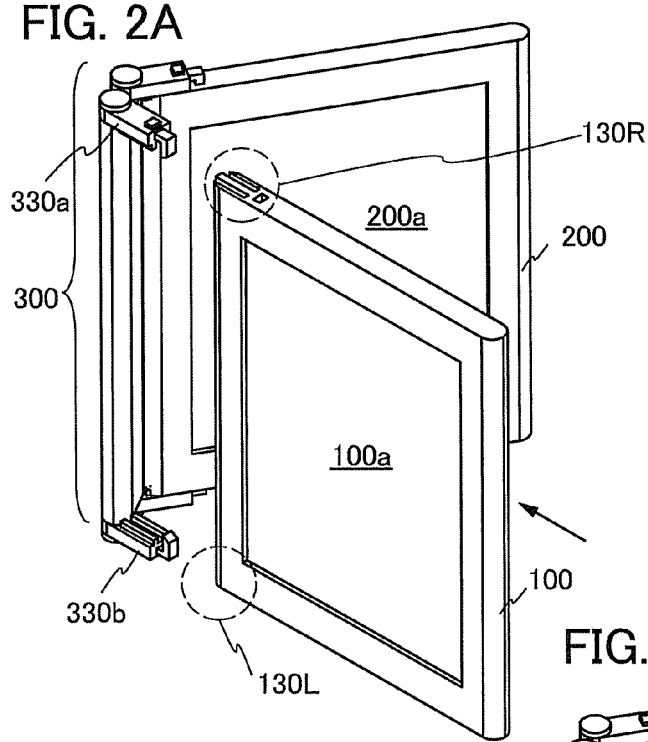
FIGS. 2A to 2C illustrate a structure of an electronic apparatus in accordance with an embodiment.
Figure 2B:
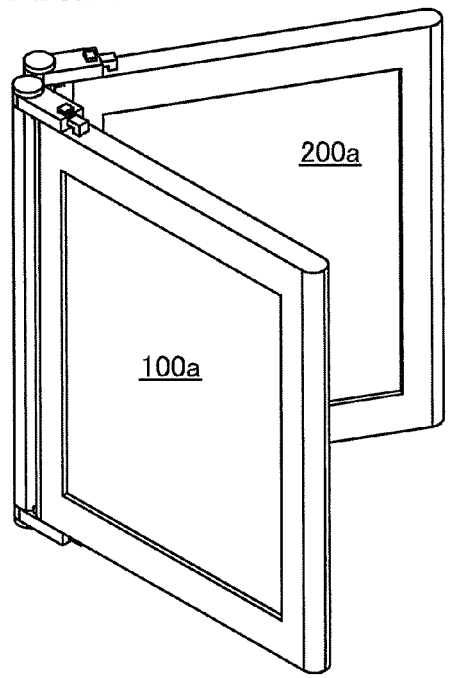
Figure 2C:
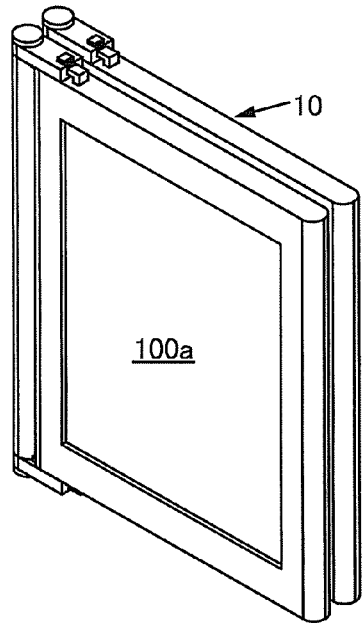

FIGS. 2A to 2C illustrate an embodiment of another method of use of the electronic apparatus 10. In FIG. 2A, the first electronic device 100 and the second electronic device 200 are coupled together in a state where the first electronic device 100 and the second electronic device 200 are arranged in the same direction. As shown in FIG. 2B, the electronic apparatus 10 is folded along the base unit 300. Thus, as shown in FIG. 2C, the first surface 200a of the second electronic device 200 can be covered with a second surface of the first electronic device 100, which is not shown.

When the electronic apparatus is folded in this manner, the first surface 200a of the second electronic device 200 can be protected in a state where the first surface 100a of the first electronic device 100 is usable. Thus, the first surface 200a can be protected against damage due to carelessness, and unintended operation can be prevented.

Described is a method for mutually identifying a plurality of electronic devices in an electronic apparatus which is an embodiment of the present invention. Specifically, in an electronic apparatus in which a plurality of electronic devices each including a switch in a power supply circuit are coupled together through a coupler so as to be rotatable about a spindle and detachable from the spindle, an electronic device whose switch is turned on first may be identified as a first electronic device, and an electronic device whose switch in a power supply circuit is turned on after the first electronic device may be identified as a second electronic device. In other words, after a switch in an electronic device is turned on, the number of other electronic devices n in an on state is counted, so that n+1 may be the identification number of the electronic device.

According to such an identifying method, a user can use his/her electronic apparatus with an electronic device of another person connected to the electronic apparatus, which is convenient.

Further, described is another method for mutually identifying a plurality of electronic devices in the electronic apparatus which is an embodiment of the present invention. Specifically, in an electronic apparatus in which a plurality of electronic devices each including an identification signal circuit are coupled together through a coupler so as to be rotatable about a spindle and detachable from the spindle, identification signals may be assigned to electronic devices without overlap. For example, an identification signal 00 may be assigned to a first electronic device, and an identification signal 01 may be assigned to a second electronic device.

According to such an identifying method, an identification signal may be assigned only when a user uses an electronic device first, which is convenient.

FIGS. 6A to 6C, FIGS. 7A to 7C, and FIGS. 8A and 8B are perspective views of electronic devices and a base unit which are another embodiment and can be used for the electronic apparatus of the present invention.

Figure 6A:
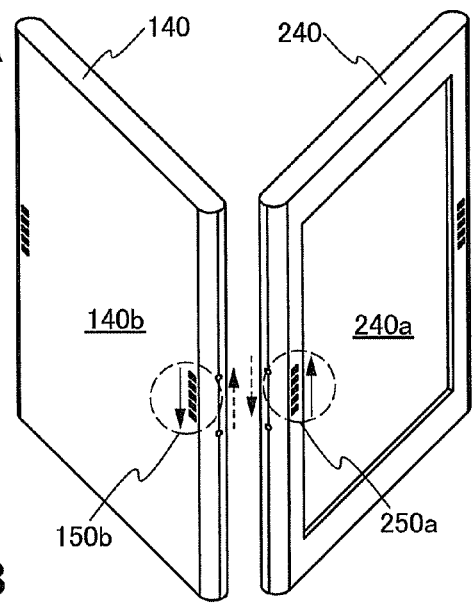
FIGS. 6A to 6C illustrate a structure of an electronic apparatus in accordance with an embodiment.

FIG. 6A illustrates a first electronic device 140 and a second electronic device 240. The first electronic device 140 includes a first connection terminal group 150a located on the side of a first surface 140a which is not shown, and a first connection terminal group 150b paired with the first connection terminal group 150a, on the side of a second surface 140b located on the rear surface of the first surface 140a. The second electronic device 240 includes a first connection terminal group 250a located on the side of a first surface 240a; and a first connection terminal group 250b paired with the first connection terminal group 250a, on the side of a second surface 240b located on the rear surface of the first surface 240a and not shown.

The first electronic device 140 and the second electronic device 240 are electronic devices which can be operated individually. Examples of electronic devices which can be operated individually include a storage device having a display function; a power source device provided with a solar battery and a secondary battery; an input device; a display device having an input function; an arithmetic device having an input function; a display device; and the like.

The first connection terminal group 150a is provided with at least terminals with different polarities. An example of the structure of the first connection terminal group 150a is described with reference to the perspective view shown in FIG. 6B. The first connection terminal group 150a includes terminals 151a to 155a each having a depression. Note that the first connection terminal group 150a, the first connection terminal group 150b, the first connection terminal group 250a, and the first connection terminal group 250b have the same structure.

Figure 6B:
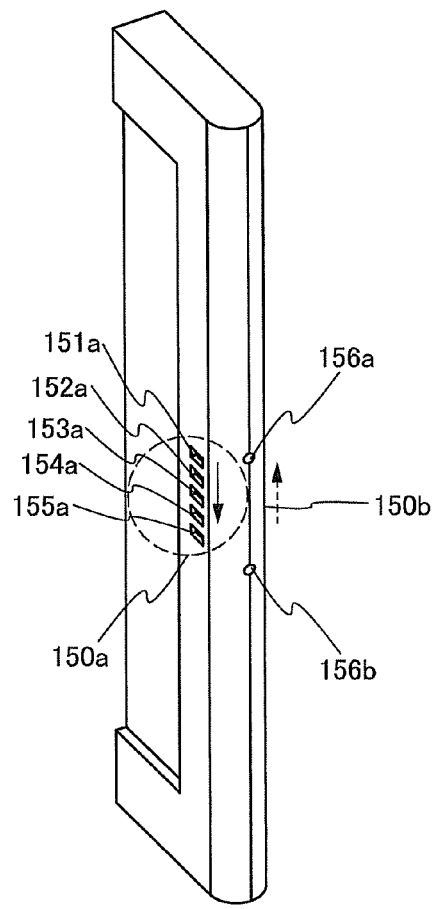
Figure 6C:
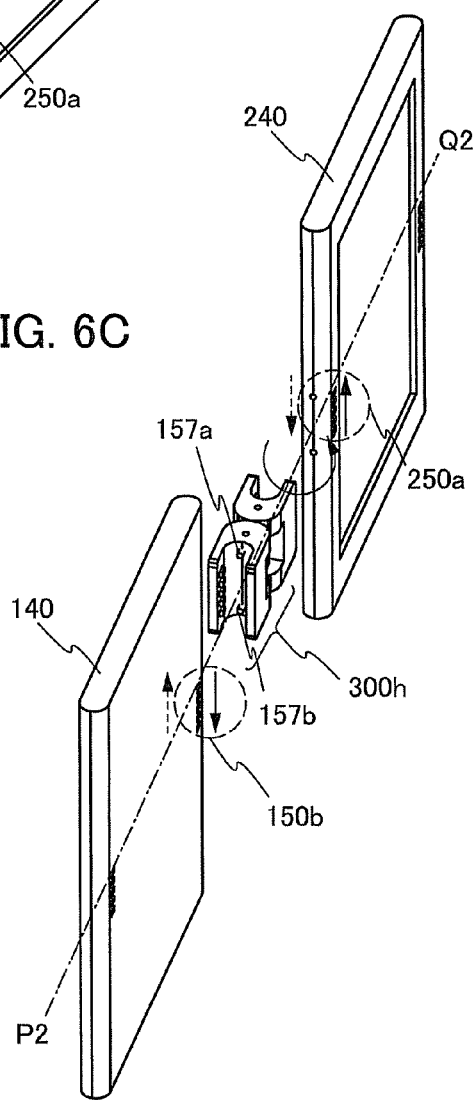

Note that arrows in FIGS. 6A to 6C indicate polarities of the first connection terminal groups. The polarities are indicated by the arrows each pointing from a terminal having the same potential as the terminal 151a to a terminal having the same potential as the terminal 155a. In the first electronic device 140, the terminal 151a and a terminal 151b are connected to each other and have the same potential, the terminals 152a and 152b are connected to each other and have the same potential, the terminals 153a and 153b are connected to each other and have the same potential, the terminals 154a and 154b are connected to each other and have the same potential, and the terminals 155a and 155b are connected to each other and have the same potential.

For example, a low potential is supplied from the second electronic device 240 to one of the terminals, i.e., the terminal 151a, in the first connection terminal group in the first electronic device 140, and a high potential is supplied to the other terminals, i.e., the terminals 152a to 155a; thus, power or a signal can be supplied from the second electronic device 240 to the first electronic device 140.

At least one of electronic devices in an embodiment of the present invention includes a pair of first connection terminal groups whose polarities are symmetric with respect to one rotation axis. Specifically, as indicated by arrows in FIG. 6C, the polarities are symmetric with respect to one rotation axis P2-Q2.

Note that a base unit 300h includes a guide pin 157a and a guide pin 157b. The electronic device includes a guide hole into which the guide pin is fitted. FIG. 6B illustrates a guide hole 156a and a guide hole 156b included in the first electronic device 140. The fit between the guide pins and the guide holes makes it possible to firmly couple the electronic device to the base unit. Further, the fit between the guide pins and the guide holes can relieve the stress applied to a second connection terminal group of a base unit connected to a first connection terminal group of the electronic device.

The first connection terminal group 150a illustrated in this embodiment can be detachably coupled to a coupler of the base unit 300h. The terminals of the first connection terminal groups 150a and 150b are arranged so that the polarities thereof are symmetric with respect to one rotation axis P2-Q2. Thus, the terminal of the first connection terminal group 150a illustrated in this embodiment can be connected to the base unit 300h after the first electronic device 140 is reversed by the rotation about one rotation axis P2-Q2. Note that here, "coupling" not only means electrical connection but also means mechanical connection.

FIG. 7A illustrates a first electronic device 160 and a second electronic device 260. The first electronic device 160 includes a first surface 160a not shown, a second surface 160b which is located on the rear surface of the first surface 160a, a first connection terminal group 170R, a first connection terminal group 170C, and a first connection terminal group 170L. Further, the second electronic device 260 includes a first surface 260a, a second surface 260b which is located on the rear surface of the first surface 260a and is not shown, a first connection terminal group 270R, a first connection terminal group 270C, and a first connection terminal group 270L.

The first electronic device 160 and the second electronic device 260 are electronic devices which can be operated individually. Examples of electronic devices which can be operated individually include a storage device having a display function; a power source device provided with a solar battery and a secondary battery; an input device; a display device having an input function; an arithmetic device having an input function; a display device; and the like.

The first connection terminal group 170R, the first connection terminal group 170C, and the first connection terminal group 170L are provided with at least terminals with different polarities. Further, the first connection terminal group 170R, the first connection terminal group 170C, and the first connection terminal group 170L have the same structure. An example of the structure is described with reference to a perspective view shown in FIG. 7B. Note that the first connection terminal group 170C includes terminals 171a to 175a each having a projection and terminals 171b to 175b each having a projection.

The first connection terminal group 170R and the first connection terminal group 270R have the same structure. The first connection terminal group 170C and the first connection terminal group 270C have the same structure. The first connection terminal group 170L and the first connection terminal group 270L have the same structure.

Note that arrows in FIGS. 7A to 7C indicate polarities of the first connection terminal groups. The polarities are indicated by the arrows each pointing from a terminal having the same potential as the terminal 171a to a terminal having the same potential as the terminal 175a. In the first electronic device 160, the terminals 171a and 171b are connected to each other and have the same potential, the terminals 172a and 172b are connected to each other and have the same potential, the terminals 173a and 173b are connected to each other and have the same potential, the terminals 174a and 174b are connected to each other and have the same potential, and the terminals 175a and 175b are connected to each other and have the same potential.

For example, a low potential is supplied from the second electronic device 260 to one of the terminals, i.e., the terminal 171a, in the first connection terminal group in the first electronic device 160, and a high potential is supplied to the other terminals, i.e., the terminals 172a to 175a; thus, power or a signal can be supplied from the second electronic device 260 to the first electronic device 160.

One of electronic devices in an embodiment of the present invention includes a pair of first connection terminal groups whose polarities are symmetric with respect to one rotation axis. Specifically, as indicated by arrows in FIG. 7C, the polarities of the first connection terminal groups are symmetric with respect to one rotation axis P3-Q3.

The first connection terminal group 170R, the first connection terminal group 170C, and the first connection terminal group 170L which are illustrated in this embodiment can be detachably coupled to a coupler of a base unit 300i. The terminals of the first connection terminal groups 170R, 170C, and 170L illustrated in this embodiment are arranged so that the polarities thereof are symmetric with respect to one rotation axis P3-Q3. Thus, the first electronic device 160 can be reversed by the rotation about one rotation axis P3-Q3 and connected to the base unit.

Figure 8A:
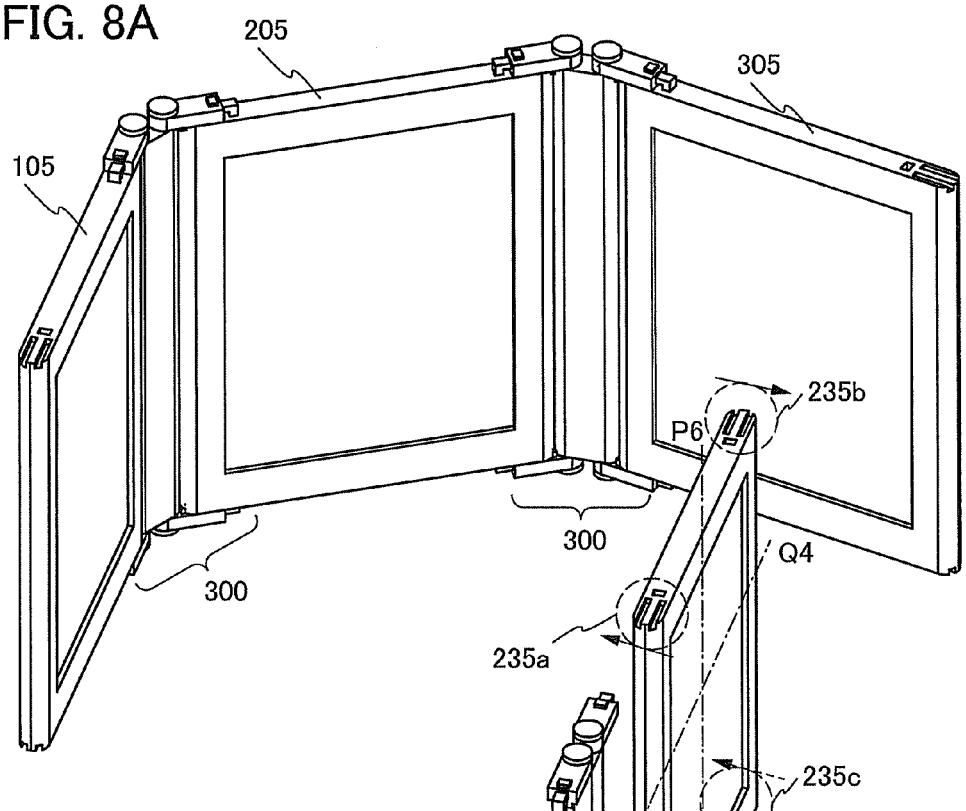
FIGS. 8A and 8B illustrate a structure of an electronic apparatus in accordance with an embodiment.

FIG. 8A is a perspective view of another embodiment of the present invention. An electronic apparatus illustrated in FIG. 8A includes a first electronic device 105, a second electronic device 205, and a third electronic device 305. The first electronic device 105, the second electronic device 205, and the third electronic device 305 are coupled together through base units 300. The first electronic device 105, the second electronic device 205, and the third electronic device 305 have the same structure including four first connection terminal groups.

Figure 8B:
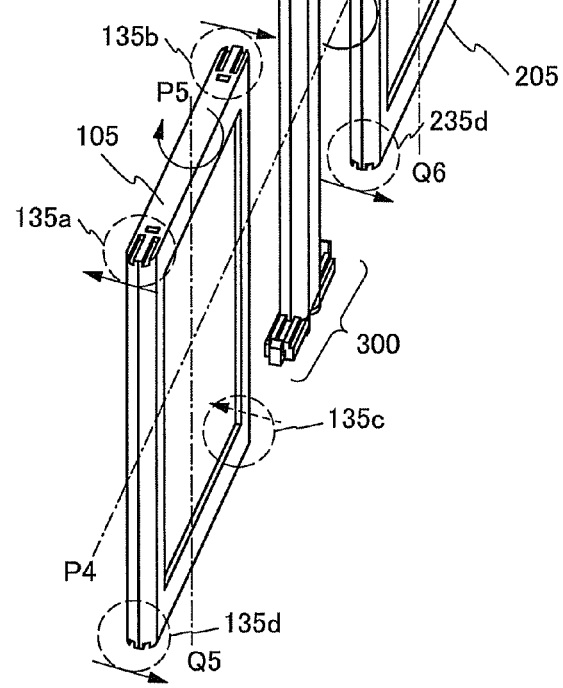

FIG. 8B illustrates the arrangement of first connection terminal groups of the first electronic device 105 and the second electronic device 205. The first electronic device 105 includes first connection terminal groups 135a to 135d, and the second electronic device 205 includes first connection terminal groups 235a to 235d. The first connection terminal groups 135a to 135d and the first connection terminal groups 235a to 235d have the same structure as the first connection terminal group 130L illustrated in FIG. 3B.

Arrows in FIG. 8B indicate polarities of the first connection terminal groups. The first electronic device 105, the second electronic device 205, and the third electronic device 305 each include two pairs of first connection terminal groups whose polarities are symmetric with respect to one rotation axis. Specifically, description is made with the use of the first electronic device 105. The first connection terminal group 135a and the first connection terminal group 135d of the first electronic device 105 which are in a pair are arranged so that the polarities thereof are symmetric with respect to a rotation axis P4-Q4. The first connection terminal group 135a and the first connection terminal group 135b of the first electronic device 105 which are in another pair are arranged so that the polarities thereof are symmetric with respect to a rotation axis P5-Q5.

With such an arrangement, the first electronic device 105 can be coupled to the base unit 300 after the first electronic device 105 is reversed by the rotation about the rotation axis P4-Q4 or the rotation axis P5-Q5. With two pairs of first connection terminal groups, another electronic device can be connected through one electronic device. For example, the first electronic device 105 and the third electronic device 305 can be connected to each other through the second electronic device 205.

Figure 18:
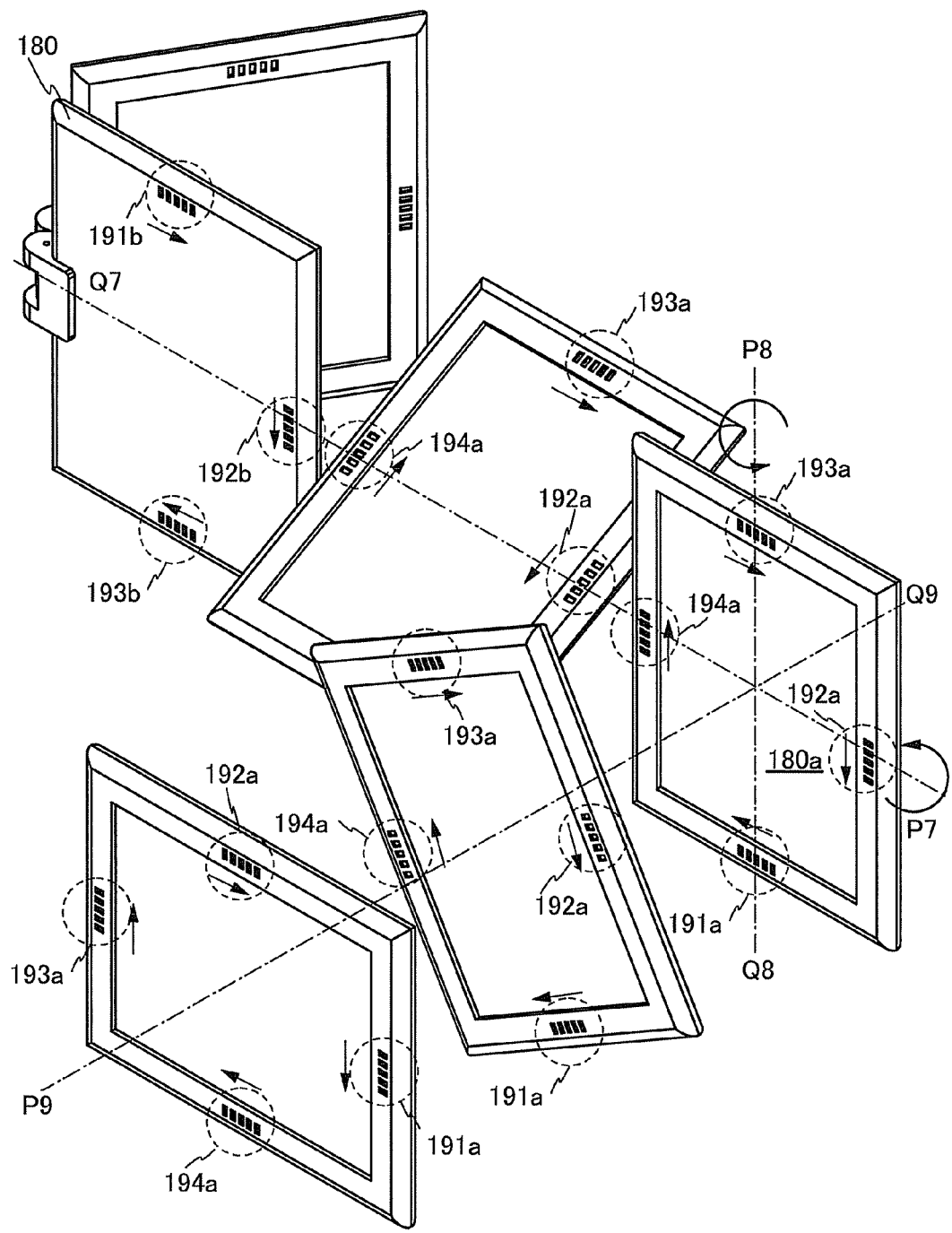
FIG. 18 illustrates a structure of an electronic apparatus in accordance with an embodiment.

FIG. 18 is a perspective view of another embodiment of the present invention. In a first electronic device 180, first connection terminal groups 191a to 194a are provided on a first surface 180a to be out of phase with each other by 90° with respect to a rotation axis P9-Q9. Further, a first connection terminal group 191b paired with the first connection terminal group 191a is provided on the rear surface of the first connection terminal group 191a, a first connection terminal group 192b paired with the first connection terminal group 192a is provided on the rear surface of the first connection terminal group 192a, a first connection terminal group 193b paired with the first connection terminal group 193a is provided on the rear surface of the first connection terminal group 193a, and a first connection terminal group 194b paired with the first connection terminal group 194a is provided on the rear surface of the first connection terminal group 194a.

Figure 19:
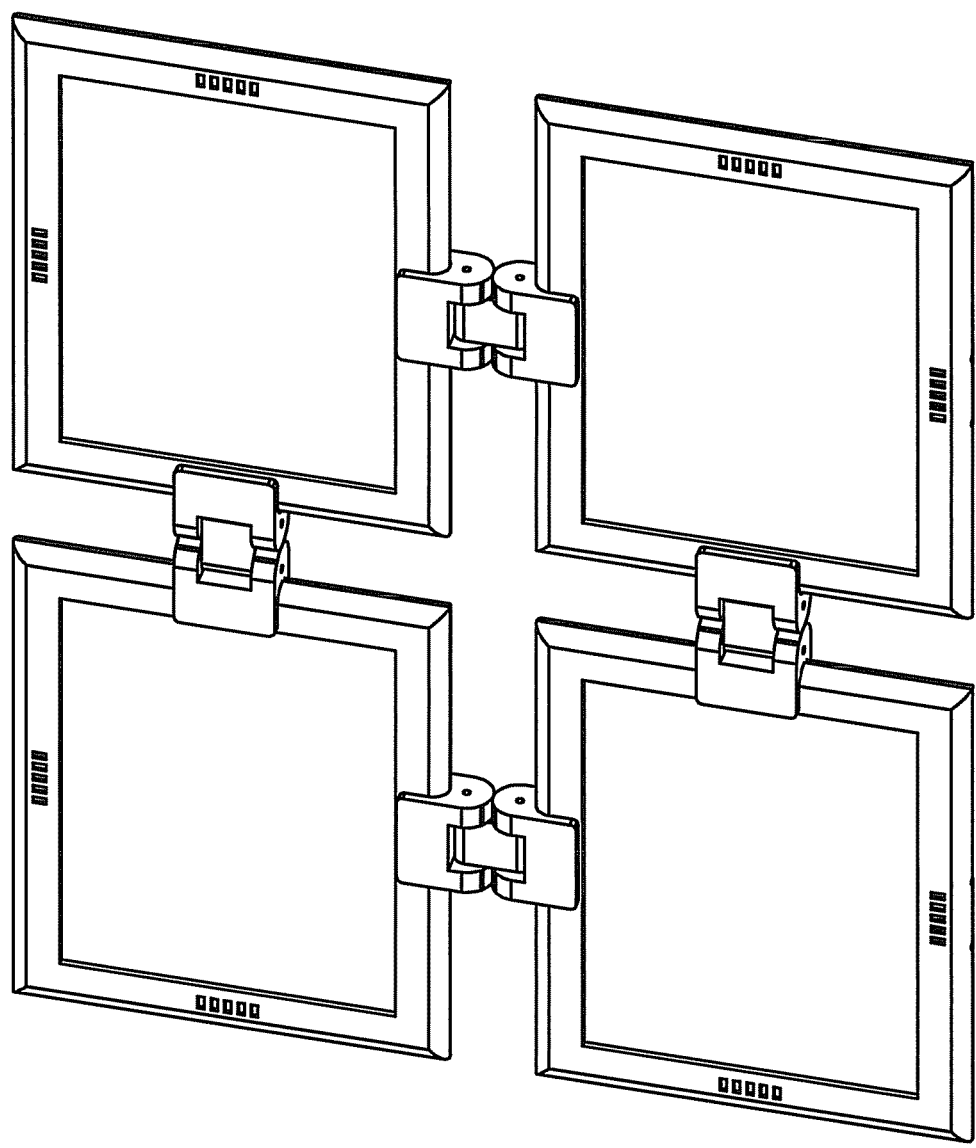
FIG. 19 illustrates a structure of an electronic apparatus in accordance with an embodiment.

Note that arrows in FIG. 18 indicate polarities of the first connection terminal groups. A pair of first connection terminal groups is arranged so that the polarities thereof are symmetric with respect to one rotation axis (specifically, a rotation axis P7-Q7 and a rotation axis P8-Q8). The first connection terminal groups are provided to be out of phase with each other by 90° with respect to the rotation axis P9-Q9, whereby the first electronic device 180 which is made to rotate by 90° around the rotation axis P9-Q9 can be coupled. Consequently, as illustrated in FIG. 19, four electronic devices can be coupled together in two directions.

Figure 20:
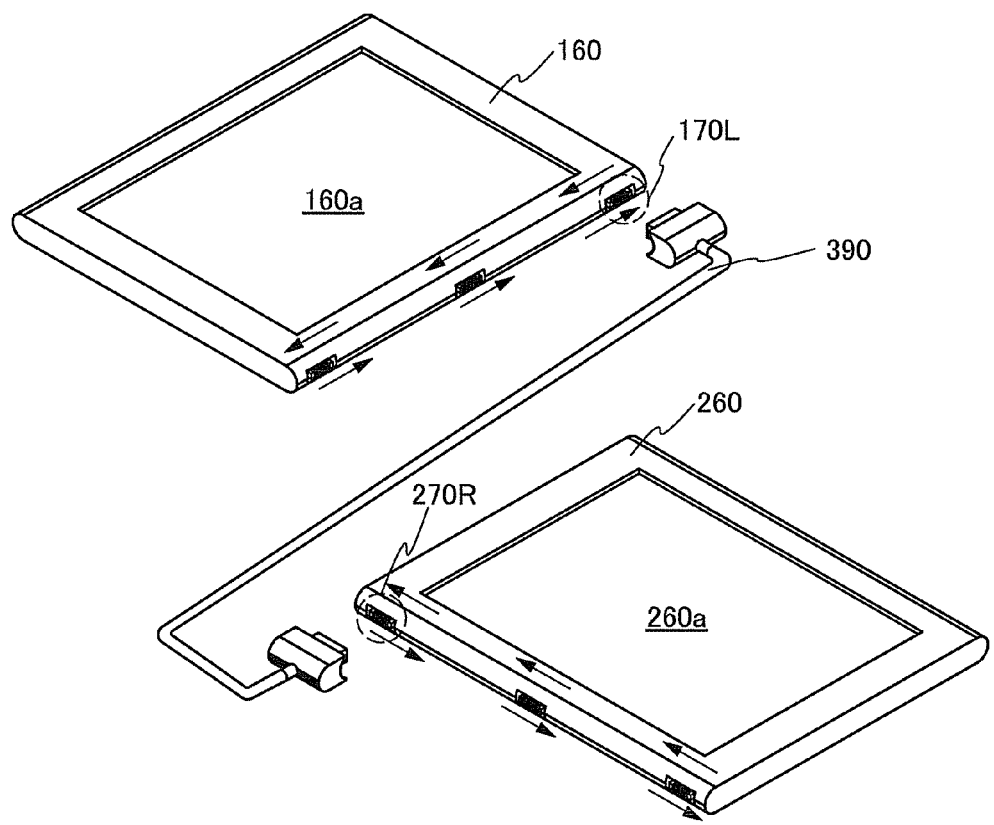
FIG. 20 illustrates a structure of an electronic apparatus in accordance with an embodiment.

FIG. 20 is a perspective view of another embodiment of the present invention. A first electronic device 160 and a second electronic device 260 are connected to each other through a connection cable 390, so that an electronic apparatus is formed. The first electronic device 160 and the second electronic device 260 have the same structure including three first connection terminal groups. A coupler which is coupled to the first connection terminal group is provided on each end of the connection cable 390. The coupler is provided with a second connection terminal group electrically connected to the first connection terminal group.

The first electronic device 160 is provided with the first connection terminal group 170L. As for the first connection terminal group 170L, a group of a plurality of terminals on the first surface 160a side and a group of a plurality of terminals on the second surface 160b are paired. The first connection terminal group 170L of the first electronic device 160 and the first connection terminal group 270R of the second electronic device 260 can be electrically connected to each other through the coupler of the connection cable 390. Note that arrows in FIG. 20 indicate polarities of the first connection terminal groups. A pair of first connection terminal groups is provided so that the polarities thereof are symmetric with respect to one rotation axis. Therefore, a coupler at the end of the connection cable 390 can be connected to the electronic device even when the connection cable 390 is reversed. Thus, it is not necessary for a user to carefully check the orientation of the coupler for the connection between the first electronic device 160 and the second electronic device 260, which is convenient.

According to the electronic apparatus illustrated in this embodiment, it is possible to provide a portable electronic apparatus from a multi-function electronic apparatus to a single-function electronic apparatus, in which an electronic device having a function needed for a user is selected or electronic devices are combined. Further, the electronic apparatus can be reduced in weight and volume, so that the burden on the user carrying the electronic apparatus can be reduced.

This embodiment can be combined with any of the other embodiments in this specification as appropriate.

(Embodiment 2)

Figure 9A:
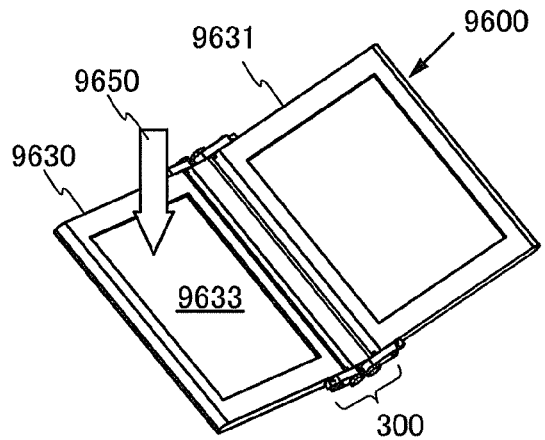
FIGS. 9A to 9C illustrate a structure of an electronic apparatus in accordance with an embodiment.
Figure 9B:
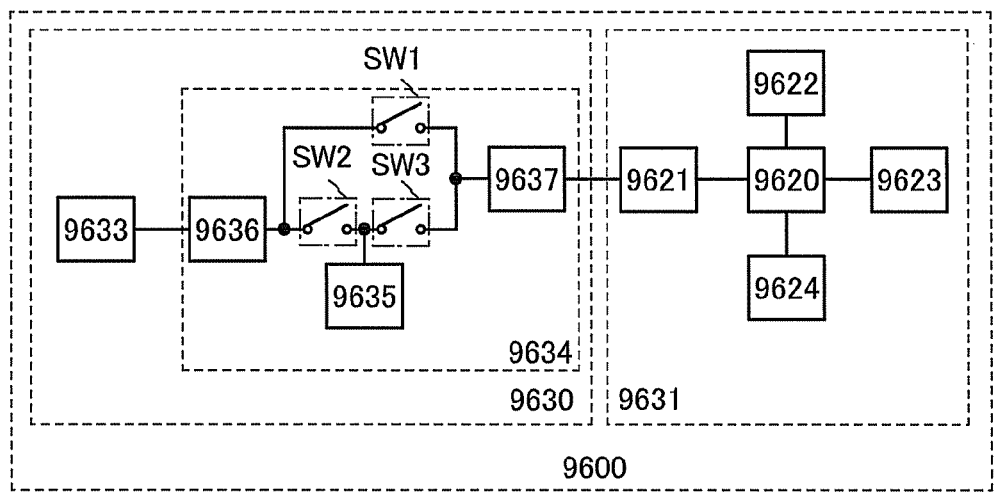

In this embodiment, an electronic apparatus 9600 including a power source device 9630 provided with a solar battery, as a first electronic device, and a display device 9631 provided with a storage device, as a second electronic device is described with reference to FIGS. 9A to 9C. FIG. 9A is a perspective view of the appearance of the electronic apparatus 9600. FIG. 9B is a block diagram of the electronic apparatus 9600.

A housing of the power source device 9630 includes a solar battery 9633 and a charge/discharge circuit 9634. The solar battery 9633 may include a silicon semiconductor, for example; the silicon semiconductor may be single crystalline, polycrystalline, or amorphous. Further, the solar battery 9633 may include a stack of the aforementioned silicon semiconductors which are combined. Of course, a solar battery including a compound semiconductor or a dye sensitization type solar battery may be used.

The housing of the power source device 9630 is provided with a pair of first connection terminal groups which can be coupled to a spindle of the base unit 300 through a coupler.

The charge/discharge circuit 9634 includes a battery 9635, a converter 9636, a converter 9637, and switches SW1 to SW3. The converter 9636 is a DC-DC converter.

Next, the operation of the power source device 9630 is described. In the case where external light 9650 is received by the solar battery 9633, the switch SW1 is turned on, and power generated by the solar battery 9633 is stepped up or down by the converter 9636 and the converter 9637 and then supplied to the display device 9631 through the base unit 300. Further, the switch SW1 is turned off and the switch SW2 is turned on, and power generated by the solar battery 9633 is stepped up or down by the converter 9636 and then stored in the battery 9635; thus, charging is performed.

When power is not generated by the solar battery 9633 due to shortage of the external light 9650, the switch SW1 is turned off and the switch SW3 is turned on, and power stored in the battery 9635 is stepped up or down by the converter 9637 and then supplied to the display device 9631 through the base unit 300.

Note that the switches SW1 to SW3 may be selectively turned on or off as appropriate in accordance with the amount of power consumed by the display device 9631 which is connected through the base unit 300, the intensity of the external light 9650, the charge amount of the battery 9635, and the like.

Although in this embodiment, the solar battery 9633 is illustrated as a means for charging the battery 9635, the battery 9635 may be charged by other means. In addition, a combination of the solar battery 9633 and another means for charge may be used.

The display device 9631 includes a control circuit 9620, a display circuit 9623, a memory circuit 9624, an input circuit 9622, and a power source circuit 9621.

A housing of the display device 9631 includes a pair of first connection terminal groups which can be coupled to a spindle of the base unit 300 through a coupler.

The control circuit 9620 controls the memory circuit 9624, the display circuit 9623, and the input circuit 9622. The memory circuit 9624 has a function of reading data stored in a memory element and a memory medium. Further, data may be written into the memory element or the memory medium by a user. The display circuit 9623 is provided with a liquid crystal display panel or an electrophoretic display panel. For the input circuit, a keyboard or a means for selecting and inputting a coordinate with the use of a display panel provided with a touch sensor may be used.

The power source circuit 9621 supplies a power supply potential to the control circuit 9620, the display circuit 9623, the memory circuit 9624, and the input circuit 9622. The power source circuit 9621 is provided with a battery which enables the display device 9631 to operate independently.

The control circuit 9620 outputs data stored in the memory circuit 9624 to the display circuit 9623 in accordance with an instruction from a user which is input from the input circuit 9622. The control circuit 9620 may have a function of storing data to the memory circuit 9624 in accordance with an instruction from a user which is input from the input circuit 9622.

With the display device 9631 having such a structure, books, photographs, images, and the like which are converted into electronic form can be stored in the display device 9631, and the data converted into electronic form can be reproduced and displayed by a user as needed. Further, when a function is limited, the display device 9631 which is lightweight can be provided. Thus, the burden on the user carrying the device can be reduced, and reproducing and displaying can be performed even when the user is away from home or the like, which is convenient.

The power source device 9630 and the display device 9631 of the electronic apparatus 9600 are coupled together through the base unit 300. The power source device 9630 and the display device 9631 can be coupled together through the base unit 300 in a manner illustrated in FIG. 5.

That is, the power source device 9630 is used as the first electronic device 100 illustrated in FIG. 5, and a power supply potential is output from the converter 9637 to one of terminals of the first connection terminal group 130L. Further, the display device 9631 is used as the second electronic device 200, and a terminal to which the power supply circuit outputs a power supply potential is connected to one of terminals of the first connection terminal group 230L. Note that the terminal from which a power supply potential of the first connection terminal group 130L is output and the terminal from which a power supply potential of the first connection terminal group 230L is output have the same polarity.

In the second connection terminal group of the coupler 330a of the base unit 300 and the second connection terminal group of the coupler 340a, terminals having the same polarities are electrically connected to each other and have the same potential. Therefore, by the coupling between the first connection terminal group of the first electronic device 100 and the coupler of the base unit 300 and the connection between the first connection terminal group of the second electronic device 200 and the coupler of the base unit 300, power can be supplied from the first electronic device to the second electronic device. Specifically, a power supply potential can be supplied from the power source device 9630 to the display device 9631.

Next, an embodiment of the electronic apparatus 9600 of this embodiment which is another method of use is described.

FIG. 9A illustrates an embodiment of the electronic apparatus 9600 of this embodiment which is used in an open state. When the electronic apparatus 9600 is used in such a manner, characters and images displayed on the display device 9631 can be seen while power is generated by the solar battery mounted on the power source device 9630. Thus, the electronic apparatus 9600 can be used without concern about the remaining amount of the power in the battery. Although FIG. 9A illustrates a method of use in which the display device 9631 is located on the right side and the power supply device 9630 is located on the left side, the devices may be interchanged and attached to the base unit.

Figure 9C:
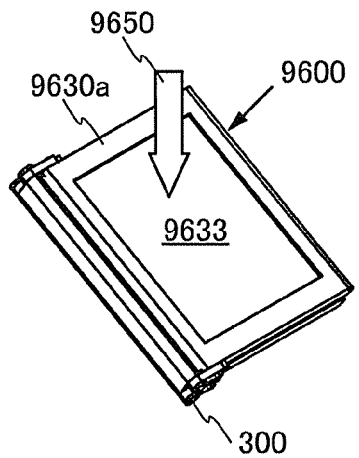

FIG. 9C illustrates an embodiment of the electronic apparatus of this embodiment, which is closed when being used. When the electronic apparatus is used in such a manner, power can be generated by a solar battery mounted on the power source device 9630 and the built-in battery 9635 can be charged in a period of time in which the display device 9631 is not used.

Although not shown, the electronic apparatus can be folded so that a display panel of the display device 9631 is oriented toward a user. Thus, the display device 9631 can be used in confined areas of public transport such as an airplane or a train, for example, which is convenient.

According to the electronic apparatus illustrated in this embodiment, it is possible to provide a portable electronic apparatus from a multi-function electronic apparatus to a single-function electronic apparatus, in which an electronic device having a function needed for a user is selected or electronic devices are combined. Further, the electronic apparatus can be reduced in weight and volume, so that the burden on the user carrying the electronic apparatus can be reduced.

Further, it is possible to provide an electronic apparatus including a solar battery which can receive light easily even when it is difficult to receive power from a lamp line or regardless of whether the electronic apparatus is in use or not.

In the electronic apparatus illustrated in this embodiment, the first electronic device and the second electronic device can be coupled to the base unit regardless of the orientations of the electronic devices. Therefore, the first electronic device and the second electronic device can be coupled to the base unit in accordance with the needs of a user even when a dominant hand of the user is right or left or even when characters are displayed on the display device vertically or horizontally, which is convenient.

This embodiment can be combined with any of the other embodiments in this specification as appropriate.

(Embodiment 3)

In this embodiment, a liquid crystal display device in which power consumption is reduced, which is applicable to Embodiment 2, and a mode of a driving method thereof is described with reference to FIG. 10, FIG. 11, FIG. 12, FIGS. 13A and 13B, and FIG. 14.

The block diagram of FIG. 10 illustrates components in a liquid crystal display device 1100 described in this embodiment. The liquid crystal display device 1100 includes an image processing circuit 1110, a power supply 1116, a display control circuit 1113, and a display panel 1120. In the case where the liquid crystal display device 1100 is a transmissive liquid crystal display device or a transflective liquid crystal display device, a backlight unit 1130 is provided as a light source.

An image signal (image signal Data) is supplied to the liquid crystal display device 1100 from an external device connected thereto. Power supply potentials (a high power supply potential $V_{dd}$, a low power supply potential $V_{ss}$, and a common potential $V_{com}$) are supplied to the display control circuit 1113 when the power supply 1116 is turned on. Control signals (a start pulse SP and a clock signal CK) are supplied to a display panel 1120 by the display control circuit 1113.

Note that the high power supply potential $V_{dd}$ is a potential higher than a reference potential, and the low power supply potential $V_{ss}$ is a potential lower than or equal to the reference potential. Both the high power supply potential $V_{dd}$ and the low power supply potential $V_{ss}$ are preferably potentials at which a transistor can operate. Note that the high power supply potential $V_{dd}$ and the low power supply potential $V_{ss}$ may be collectively referred to as a power supply voltage in some cases.

The common potential $V_{com}$ can be any potential as long as it is a fixed potential serving as a reference with respect to a potential of an image signal supplied to a pixel electrode. For example, the common potential $V_{com}$ may be a ground potential.

The image signal Data may be inverted by dot inversion driving, source line inversion driving, gate line inversion driving, frame inversion driving, or the like as appropriate and inputted to the liquid crystal display device 1100. In the case where the image signal Data is an analog signal, such a structure that the image signal is converted into a digital signal by an A/D converter or the like and supplied to the liquid crystal display device 1100 is preferably employed.

In this embodiment, the common potential $V_{com}$ which is a fixed potential is supplied to a common electrode 1128 and one of electrodes of a capacitor 1210 from the power supply 1116 through the display control circuit 1113.

The display control circuit 1113 supplies an image signal processed in the image processing circuit 1110, the control signals (specifically, signals for controlling switching between supply and stop of a control signal, such as the start pulse SP and the clock signal CK), and the power supply potentials (the high power supply potential $V_{dd}$, the low power supply potential $V_{ss}$, and the common potential $V_{com}$) to the display panel 1120 and which also supplies a backlight control signal (specifically, a signal with which a backlight control circuit 1131 controls on and off of a backlight) to the backlight unit 1130.

The image processing circuit 1110 analyzes, calculates, and/or processes the input image signal (image signal Data) and outputs the processed image signal together with a control signal to the display control circuit 1113.

For example, the image processing circuit 1110 analyzes the inputted image signal Data and determines whether the signal is for a moving image or a still image, and outputs a control signal including the determination result to the display control circuit 1113. Moreover, the image processing circuit 1110 can extract data for a one-frame still image from the image signal Data including data for a still image, and output the extracted data to the display control circuit 1113, together with a control signal indicating that the extracted data is for a still image. Furthermore, the image processing circuit 1110 can sense data for a moving image from the image signal Data including data for a moving image, and output data for successive frames to the display control circuit 1113, together with a control signal indicating that the sensed data is for a moving image.

The image processing circuit 1110 makes the liquid crystal display device 1100 of this embodiment operate in a different manner in accordance with the input image signal Data. In this embodiment, a mode of operation performed when the image processing circuit 1110 determines an image as a still image is a still image display mode, whereas a mode of operation performed when the image processing circuit 1110 determines an image as a moving image is a moving image display mode. In this specification, an image displayed in the still-image display mode is referred to as a still image.

The image processing circuit 1110 described as an example in this embodiment may have a function of switching the display mode. The function of switching the display mode is a function of switching the display mode between a moving image display mode and a still image display mode without a judgment by the image processing circuit 1110 in such a manner that a user selects an operation mode of the liquid crystal display device by hand or using an external connection device.

Note that the above function is one example of functions which the image processing circuit 1110 has, and a variety of image processing functions may be selected depending on usage of the display device.

Note that since an image signal which is converted to a digital signal is easily calculated (e.g., a difference between image signals is detected), in the case where an input image signal (image signal Data) is an analog signal, an A/D converter or the like can be provided in the image processing circuit 1110.

The display panel 1120 includes a pair of substrates (a first substrate and a second substrate). A liquid crystal layer is sandwiched between the pair of substrates, and a liquid crystal element 1215 is formed. Over the first substrate, a driver circuit portion 1121, a pixel portion 1122, a terminal portion 1126, and a switching element 1127 are provided. On the second substrate, the common electrode 1128 (also referred to as a common electrode or a counter electrode) is provided. In this embodiment, a common connection portion (also referred to as a common contact) is provided for the first substrate or the second substrate so that a connection portion over the first substrate can be connected to the common electrode 1128 on the second substrate.

A plurality of gate lines 1124 (scan lines) and a plurality of source lines 1125 (signal lines) are provided in the pixel portion 1122 and a plurality of pixels 1123 are provided in matrix so that the pixels are surrounded by the gate lines 1124 and the source lines 1125. Note that in the display panel described as an example in this embodiment, the gate lines 1124 are extended from a gate line driver circuit 1121A, and the source lines 1125 are extended from a source line driver circuit 1121B.

Figure 11:
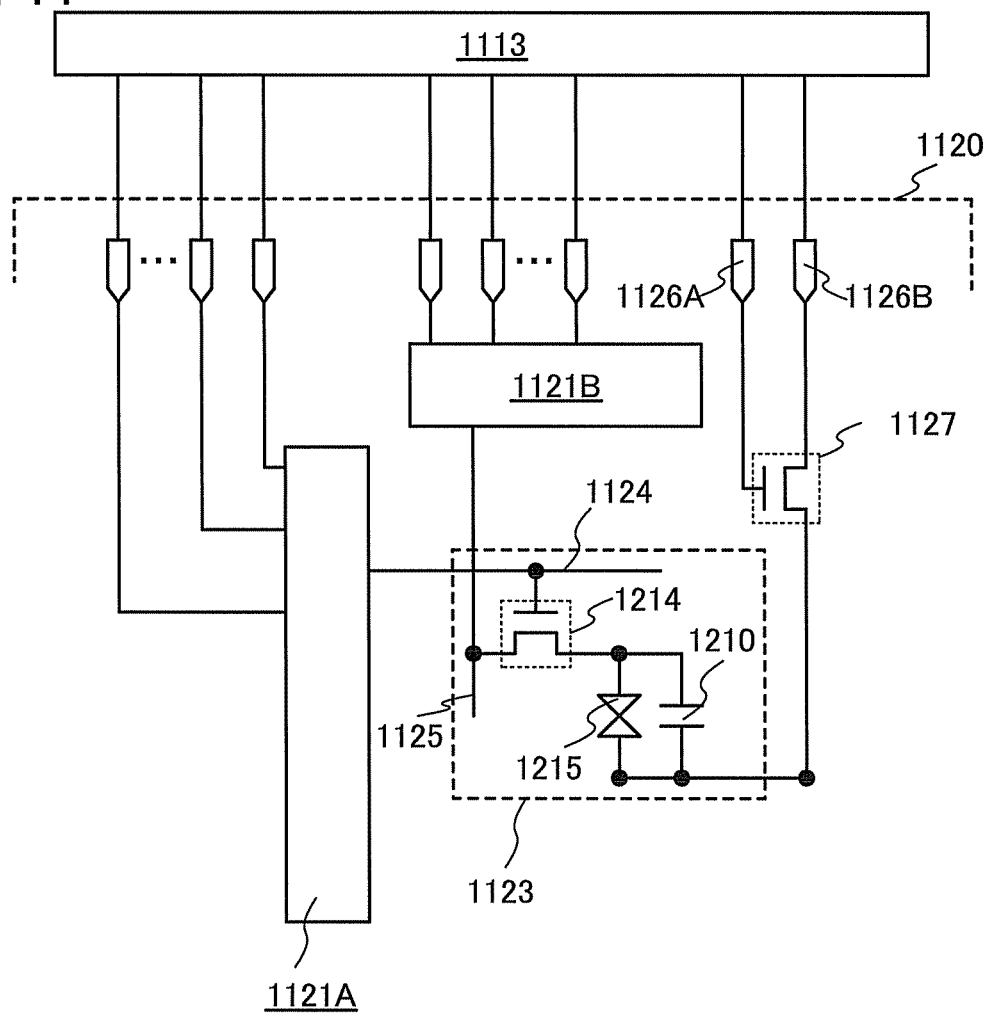
FIG. 11 illustrates a structure of a driver circuit and a pixel of a liquid crystal display device in accordance with an embodiment.

The pixels 1123 each include a transistor 1214 as a switching element, and the capacitor 1210 and the liquid crystal element 1215 which are connected to the transistor 1214 (see FIG. 11).

In the transistor 1214, a gate electrode is connected to one of the plurality of gate lines 1124 provided in the pixel portion 1122, one of a source electrode and a drain electrode is connected to one of the plurality of source lines 1125, and the other of the source electrode and the drain electrode is connected to one of the electrodes of the capacitor 1210 and one of electrodes (a pixel electrode) of the liquid crystal element 1215.

As the transistor 1214, a transistor whose off-state current is reduced is preferably used; for example, the transistor described in Embodiment 4 is preferable. When the off-state current of the transistor 1214 is reduced, charge can be stably held in the liquid crystal element 1215 and the capacitor 1210 in an off state. In the case where the transistor 1214 whose off-state current is sufficiently reduced, the pixel 1123 can also be formed without the capacitor 1210.

With this configuration, the pixel 1123 can maintain the state of data written before the transistor 1214 is turned off for a long period, so that power consumption can be reduced.

The liquid crystal element 1215 is an element which controls transmission or non-transmission of light utilizing an optical modulation action of liquid crystal. The optical modulation action of liquid crystal is controlled by an electric field applied to the liquid crystal. A direction of the electric field applied to the liquid crystal depends on a liquid crystal material, a driving method, and an electrode structure and can be selected as appropriate. For example, in the case where a driving method in which an electric field is applied in a direction of a thickness of liquid crystal (so-called a vertical direction) is used, a pixel electrode and a common electrode are provided on the first substrate and the second substrate respectively, so that the liquid crystal is interposed between the first substrate and the second substrate. In the case where a driving method in which an electric field is applied in an in-plane direction of a substrate (so-called a horizontal direction) to a liquid crystal is used, a pixel electrode and a common electrode may be provided on the same side with respect to the liquid crystal. The pixel electrode and the common electrode may have a variety of opening patterns.

As examples of a liquid crystal applied to the liquid crystal element, the following can be given: a nematic liquid crystal, a cholesteric liquid crystal, a smectic liquid crystal, a discotic liquid crystal, a thermotropic liquid crystal, a lyotropic liquid crystal, a low-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like.

In addition, any of the following can be used as a driving mode of a liquid crystal: a TN (twisted nematic) mode, an STN (super twisted nematic) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, a guest-host mode, and the like. Alternatively, an IPS (in-plane-switching) mode, an FFS (fringe field switching) mode, an MVA (multi-domain vertical alignment) mode, a PVA (patterned vertical alignment) mode, an ASM (axially symmetric aligned microcell) mode, or the like can be used. Needless to say, there is no particular limitation on a liquid crystal material, a driving method, and an electrode structure in this embodiment as long as the liquid crystal element controls transmission or non-transmission of light by the optical modulation action.

Note that, although the alignment of liquid crystals in the liquid crystal element described as an example in this embodiment is controlled by a vertical electric field generated between the pixel electrode which is provided for the first substrate and the common electrode which is provided for the second substrate and faces the pixel electrode, the alignment of the liquid crystals may be controlled by a lateral electric field by changing the pixel electrode as appropriate, depending on the liquid crystal material or the driving mode of a liquid crystal.

The terminal portion 1126 is an input terminal which supplies predetermined signals (the high power supply potential $V_{dd}$, the low power supply potential $V_{ss}$, the start pulse SP, the clock signal CK, the image signal Data, the common potential $V_{com}$, and the like) which are outputted from the display control circuit 1113, to the driver circuit portion 1121 or the common electrode 1128.

The driver circuit portion 1121 includes the gate line driver circuit 1121A and the source line driver circuit 1121B. The gate line driver circuit 1121A and the source line driver circuit 1121B are driver circuits for driving the pixel portion 1122 including the plurality of pixels and each include a shift register circuit (also referred to as a shift register).

Note that the gate line driver circuit 1121A and the source line driver circuit 1121B may be formed over the same substrate as the pixel portion 1122 or may be formed over another substrate.

The high power supply potential $V_{dd}$, the low power supply potential $V_{ss}$, the start pulse SP, the clock signal CK, and the image signal Data which are controlled by the display control circuit 1113 are supplied to the driver circuit portion 1121.

A transistor can be used as the switching element 1127. A gate electrode of the switching element 1127 is connected to a terminal 1126A, and the switching element 1127 supplies the common potential $V_{com}$ to the common electrode 1128 through a terminal 1126B in accordance with a control signal that is outputted from the display control circuit 1113. One of a source electrode and a drain electrode of the switching element 1127 may be connected to a terminal 1126B, and the other of the source electrode and the drain electrode may be connected to the common electrode 1128 so that the common potential $V_{com}$ is supplied from the display control circuit 1113 to the common electrode 1128. The switching element 1127 may be formed over the same substrate as the driver circuit portion 1121 or the pixel portion 1122, or may be formed over another substrate.

In particular, by using the transistor whose off-state current is reduced which is described in Embodiment 4 as the switching element 1127, a reduction over time in the voltage applied to both terminals of the liquid crystal element 1215 can be suppressed.

In this embodiment, the switching element 1127 is provided only in a circuit which supplies the common potential Vcom from the display control circuit 1113 to the common electrode 1128 of the display panel 1120. However, a switching element may be provided also for another wiring connected to the display panel 1120. The switching element provided for the wiring connected to the display panel 1120 is turned off, whereby a circuit on the display panel 1120 side can be in a floating state.

The common electrode 1128 is electrically connected to a common potential line which supplies the common potential $V_{com}$ controlled by the display control circuit 1113 through the common connection portion.

As a specific example of the common connection portion, a conductive particle in which an insulating sphere is covered with a thin metal film is interposed between the common electrode 1128 and the common potential line, whereby the common electrode 1128 and the common potential line can be electrically connected to each other. Note that a plurality of common connection portions may be provided in the display panel 1120.

The liquid crystal display device may include a photometric circuit. The liquid crystal display device provided with the photometric circuit can detect brightness of the environment where the liquid crystal display device is placed. When the photometric circuit detects that the liquid crystal display device is used in a dim environment, the display control circuit 1113 controls light from the backlight 1132 to have higher intensity so that visibility of the display screen is secured. In contrast, when the photometric circuit detects that the liquid crystal display device is used under extremely bright external light (e.g., under direct sunlight outdoors), the display control circuit 1113 controls light from the backlight 1132 to have lower intensity so that power consumption of the backlight 1132 is reduced. Thus, the display control circuit 1113 can control a driving method of a light source such as a backlight or a sidelight in accordance with a signal inputted from the photometric circuit.

The backlight unit 1130 includes the backlight control circuit 1131 and the backlight 1132. The backlight 1132 may be selected and combined in accordance with the use of the liquid crystal display device 1100. For the backlight 1132, a light-emitting diode (LED) or the like can be used. For example, a light-emitting element emitting white light (e.g., an LED) can be provided for the backlight 1132. A backlight signal which controls a backlight and a power supply potential are supplied from the display control circuit 1113 to the backlight control circuit 1131. Needless to say, a reflective liquid crystal display panel which can perform display by using external light without using the backlight portion 1130 is preferably used, in which case power consumption is low.

If needed, an optical film (such as a polarizing film, a retardation film, or an anti-reflection film) can be used in combination as appropriate. A light source such as a backlight that is used in a semi-transmissive liquid crystal display device may be selected and combined in accordance with the use of the liquid crystal display device 1100, and a cold cathode tube, a light-emitting diode (LED), or the like can be used. Further, a surface light source may be formed using a plurality of LED light sources, a plurality of electroluminescent (EL) light sources, or the like. As the surface light source, three or more kinds of LEDs may be used and an LED emitting white light may be used. Note that a color filter is not always provided in the case where light-emitting diodes of RGB or the like are arranged in a backlight and a successive additive color mixing method (a field sequential method) in which color display is performed by time division is employed. The use of the field sequential method in which a color filter which absorbs light of a backlight is not used makes it possible to reduce power consumption.

Next, a driving method of the liquid crystal display device 1100 illustrated in FIG. 10 will be described with reference to FIG. 11, FIG. 12, FIGS. 13A and 13B, and FIG. 14. The driving method of the liquid crystal display device described in this embodiment is a display method in which the frequency of writing in the display panel varies in accordance with properties of a display image. Specifically, in the case where image signals in successive frames are different from each other (i.e., a moving image is displayed), a display mode in which an image signal is written in each frame period is used. On the other hand, in the case where image signals in successive frames have the same image (i.e., a still image is displayed), a display mode is used in which writing of image signals is not performed or the writing frequency is extremely reduced in a period in which the same image is being displayed; the voltage applied to the liquid crystal element is held by setting potentials of the pixel electrode and the common electrode which apply the voltage to the liquid crystal element in a floating state; and accordingly a still image is displayed without an additional supply of potential.

The liquid crystal display device combines a moving image and a still image and displays images on the screen. The moving image refers to an image which is recognized as an image that is moving by the human eyes by rapidly switching a plurality of different images which are obtained by time division into a plurality of frames. Specifically, by switching images at least 60 times (60 frames) per second, the images are recognized as a moving image with little flicker by the human eyes. In contrast, unlike a moving image and a partial moving image, a still image refers to an image which does not change in successive frame periods, for example, between an n-th frame and an (n+1)-th frame though a plurality of images which are time-divided into a plurality of frame periods are switched at high speed.

First, electric power is supplied by turning on the power supply 1116 of the liquid crystal display device. The display control circuit 1113 supplies the power supply potentials (the high power supply potential $V_{dd}$, the low power supply potential $V_{ss}$, and the common potential $V_{com}$) and the control signals (the start pulse SP and the clock signal CK) to the display panel 1120.

The image signal (image signal Data) is supplied to the liquid crystal display device 1100 from the external device connected thereto. The image processing circuit 1110 of the liquid crystal display device 1100 analyzes an image signal that is inputted thereto. Here, the case in which whether the image signal is for a moving image or a still image is judged and a different signal is outputted depending on whether the image signal is for a moving image or a still image will be described.

For example, when the input image signal (image signal Data) is switched from a moving image signal to a still image signal, the image processing circuit 1110 extracts data for a still image from the inputted image signal, and outputs the extracted data together with a control signal indicating that the extracted data is for a still image to the display control circuit 1113. Furthermore, when the inputted image signal (image signal Data) is switched from a still image signal to a moving image signal, the image processing circuit 1110 outputs an image signal including data for a moving image together with a control signal indicating that the image signal is for a moving image to the display control circuit 1113.

Next, signals supplied to the pixels will be described with reference to an equivalent circuit diagram of the liquid crystal display device illustrated in FIG. 11 and a timing chart shown in FIG. 12.

Figure 12:
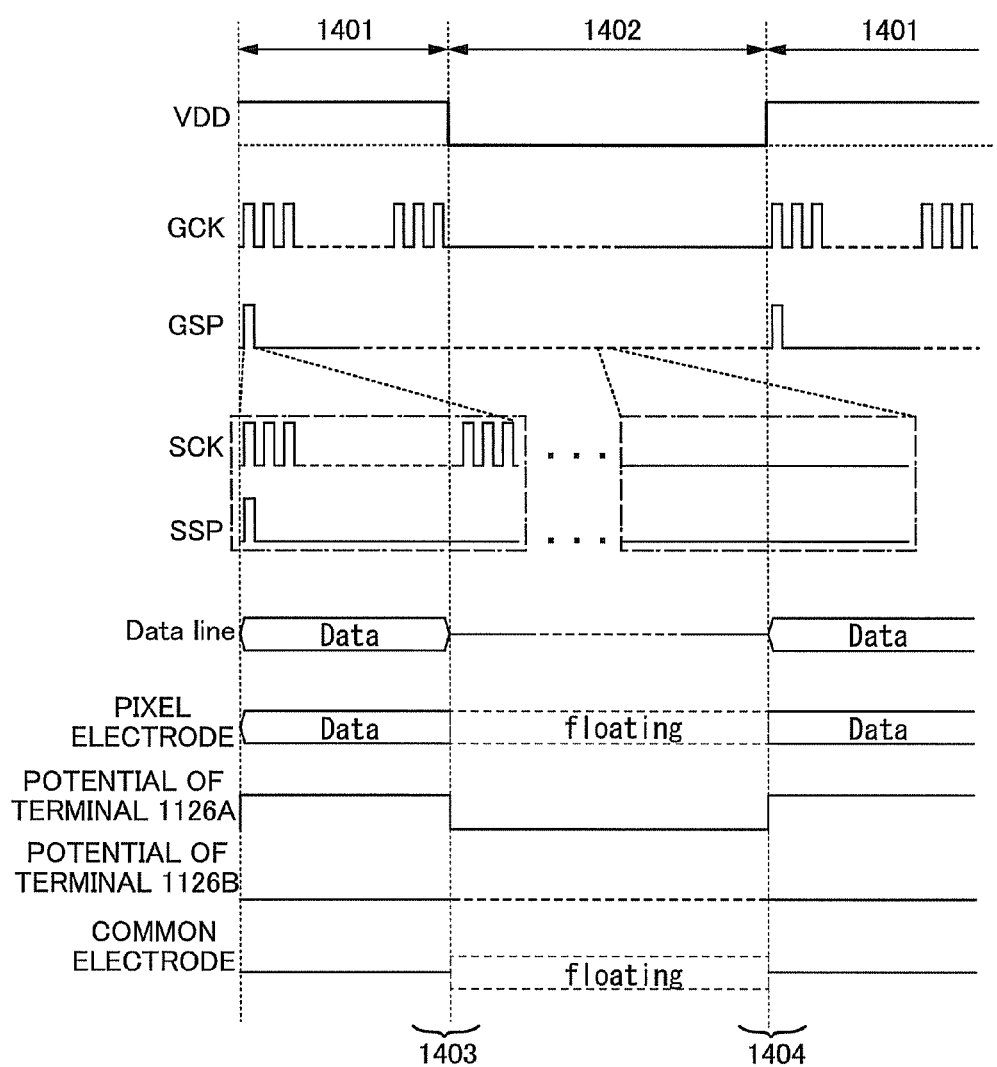
FIG. 12 is a timing chart illustrating operation of a liquid crystal display device in accordance with an embodiment.

In FIG. 12, a clock signal GCK and a start pulse GSP that the display control circuit 1113 supplies to the gate line driver circuit 1121A are shown. In addition, a clock signal SCK and a start pulse SSP that the display control circuit 1113 supplies to the source line driver circuit 1121B are shown in FIG. 12. To describe output timing of the clock signals, the waveforms of the clock signals are indicated with simple square waves in FIG. 12.

In FIG. 12, a potential of the source line 1125, a potential of the pixel electrode, a potential of the terminal 1126A, a potential of the terminal 1126B, and a potential of the common electrode are illustrated.

In FIG. 12, a period 1401 corresponds to a period during which image signals for displaying a moving image are written. In the period 1401, image signals and a common potential are supplied to each pixel of the pixel portion 1122 and the common electrode.

Further, a period 1402 corresponds to a period during which a still image is displayed. In the period 1402, the supply of image signals to each pixel of the pixel portion 1122 and the common potential to the common electrode is stopped. Note that FIG. 12 shows a structure in which supply of signals is performed so that the driver circuit portion stops operating during the period 1402; however, it is preferable to employ a structure in which image signals are regularly written depending on the length of the period 1402 and the refresh rate so as to prevent deterioration of a still image.

First, the timing chart in the period 1401 during which image signals for displaying a moving image are written will be described. In the period 1401, a clock signal is always supplied as the clock signal GCK and a pulse corresponding to vertical synchronization frequency is supplied as the start pulse GSP. Moreover, in the period 1401, a clock signal is always supplied as the clock signal SCK and a pulse corresponding to one gate selection period is supplied as the start pulse SSP.

The image signal Data is supplied to the pixels in each row through the source line 1125 and a potential of the source line 1125 is supplied to the pixel electrode depending on the potential of the gate line 1124.

The display control circuit 1113 supplies a potential which brings the switching element 1127 into electrical conduction to the terminal 1126A of the switching element 1127 and also supplies a common potential to the common electrode through the terminal 1126B.

Next, the timing chart in the period 1402 during which a still image is displayed will be described. In the period 1402, the supply of the clock signal GCK, the start pulse GSP, the clock signal SCK, and the start pulse SSP is stopped. Further, in the period 1402, the supply of the image signal Data to the source line 1125 is stopped. In the period 1402 during which the supply of the clock signal GCK and the start pulse GSP is stopped, the transistor 1214 is off, and the potential of the pixel electrode becomes in a floating state.

In addition, the display control circuit 1113 supplies a potential which brings the switching element 1127 out of electrical conduction to the terminal 1126A of the switching element 1127, so that the potential of the common electrode becomes in a floating state.

In the period 1402, both electrodes of the liquid crystal element 1215, i.e., the pixel electrode and the common electrode are put in the floating state; thus, a still image can be displayed without additional supply of potential.

The stop of the supply of a clock signal and a start pulse to the gate line driver circuit 1121A and the source line driver circuit 1121B enables low power consumption.

In particular, in the case where a transistor whose off-state current is reduced is used for the transistor 1214 and the switching element 1127, a reduction over time in the voltage applied to both terminals of the liquid crystal element 1215 can be suppressed.

Figure 13A:
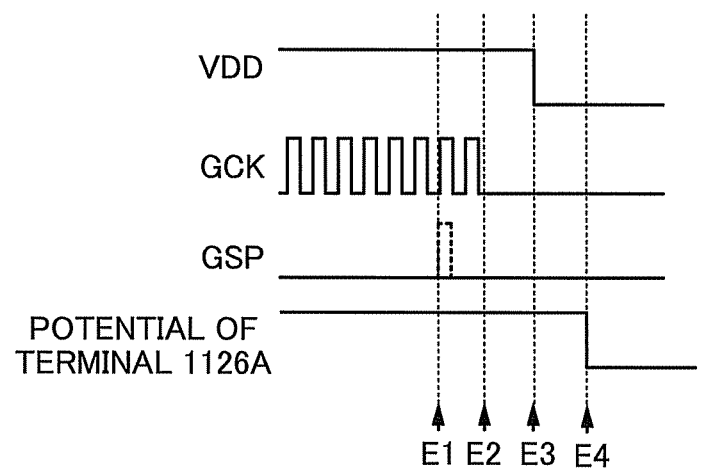
FIGS. 13A and 13B are timing charts illustrating operation of a display control circuit of a liquid crystal display device in accordance with an embodiment.
Figure 13B:
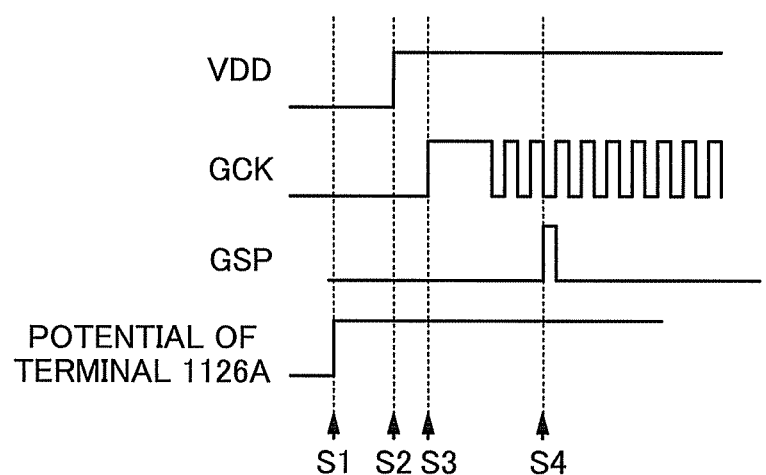

Next, operations of the display control circuit in a period in which a moving image is switched to a still image (a period 1403 in FIG. 12) and in a period in which a still image is switched to a moving image or a still image is rewritten (a period 1404 in FIG. 12) will be described with reference to FIGS. 13A and 13B. FIGS. 13A and 13B show the high power supply potential $V_{dd}$, the clock signal (here, GCK), the start pulse signal (here, GSP) which are output from the display control circuit, and the potential of the terminal 1126A.

The operation of the display control circuit in the period 1403 during which the displayed image is switched from the moving image to the still image is shown in FIG. 13A. The display control circuit stops the supply of the start pulse GSP (E1 in FIG. 13A, a first step). Then, pulse output reaches the last stage of the shift register after the supply of the start pulse GSP is stopped, and then the supply of a plurality of clock signals GCK is stopped (E2 in FIG. 13A, a second step). Then, the power supply voltage is changed from the high power supply potential $V_{dd}$ to the low power supply potential $V_{ss}$ (E3 in FIG. 13A, a third step). Next, the potential of the terminal 1126A is changed to a potential which brings the switching element 1127 out of electrical conduction (E4 in FIG. 13A, a fourth step).

Through the above procedures, the supply of the signals to the driver circuit portion 1121 can be stopped without causing a malfunction of the driver circuit portion 1121. Since a malfunction generated when the displayed image is switched from a moving image to a still image causes a noise and the noise is held as a still image, a liquid crystal display device mounted with a display control circuit with few malfunctions can display a still image with little image deterioration.

Next, operation of the display control circuit in the period 1404 in which a displayed image is switched from a still image to a moving image or a still image is rewritten is shown in FIG. 13B. The display control circuit changes the potential of the terminal 1126A to a potential which brings the switching element 1127 into electrical conduction (S1 in FIG. 13B, a first step). Next, the power supply voltage is changed from the low power supply potential $V_{ss}$, to the high power supply potential $V_{dd}$ (S2 in FIG. 13B, a second step). Then, a high potential of a pulse signal which has a longer pulse width than the normal clock signal GCK to be supplied later is applied as the clock signal GCK, and then a plurality of normal clock signals GCK are supplied (S3 in FIG. 13B, a third step). Next, the start pulse signal GSP is supplied (S4 in FIG. 13B, a fourth step).

Through the above procedures, the supply of the drive signals to the driver circuit portion 1121 can be restarted without causing a malfunction of the driver circuit portion 1121. Potentials of the wirings are sequentially changed back to those at the time of displaying a moving image, whereby the driver circuit portion can be driven without causing a malfunction.

Figure 14:
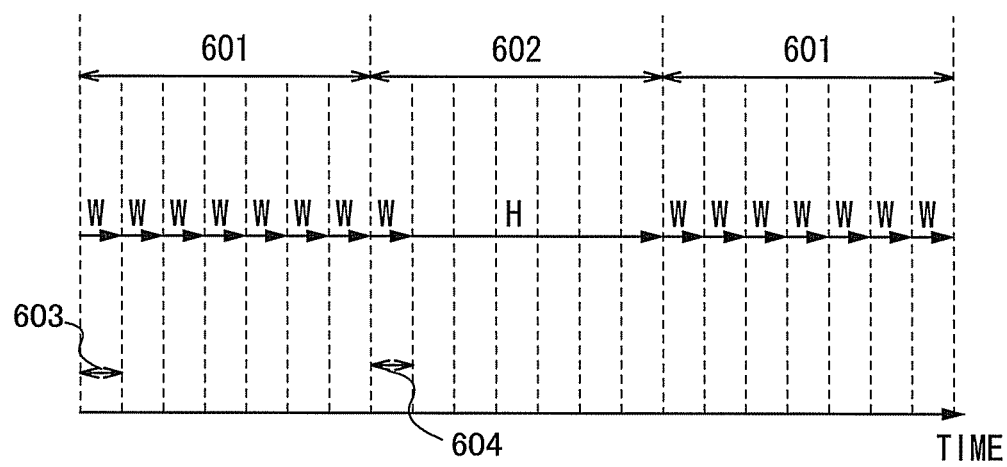
FIG. 14 schematically illustrates the frequency of writing an image signal in frame periods in a period during which a moving image is displayed and a period during which a still image is displayed in accordance with an embodiment.

FIG. 14 schematically shows writing frequency of image signals in each frame period in a period 601 during which a moving image is displayed or in a period 602 during which a still image is displayed. In FIG. 14, "W" indicates a period during which an image signal is written, and "H" indicates a period during which the image signal is held. In addition, a period 603 in FIG. 14 indicates one frame period; however, the period 603 may be a different period.

In the structure of the liquid crystal display device of this embodiment, an image signal of a still image displayed in the period 602 is written in a period 604, and the image signal written in the period 604 is held in the other period in the period 602.

In the liquid crystal display device described as an example in this embodiment, the frequency of writing an image signal in a period during which a still image is displayed can be reduced. As a result, low power consumption at the time of displaying a still image can be achieved. Further, when the liquid crystal display device is used in combination with a portable solar battery or the like, the liquid crystal display device can be used for a longer period of time even when it is difficult to obtain power from a lamp line, for example, when a user is away from home or a user having the liquid crystal display device moves.

In the case where the same images are written plural times to display a still image, visual recognition of switching between the images might cause eyestrain. In the liquid crystal display device of this embodiment, the frequency of writing image signals is reduced, whereby there is an effect of making eyestrain less severe.

Specifically, by using the transistor whose off-state current is reduced for each pixel and a switching element of a common electrode, the liquid crystal display device of this embodiment can have a long period (time) of holding a voltage in a storage capacitor. As a result, the frequency of writing image signals can be remarkably reduced, so that consumed power at the time of displaying a still image can be significantly reduced and eyestrain can be less severe.

This embodiment can be freely combined with any of the other embodiments in this specification.

The liquid crystal display device in which power consumption is reduced, which is illustrated in this embodiment, is used for Embodiment 1 or Embodiment 2. Thus, it is possible to provide a portable electronic apparatus from a multi-function electronic apparatus to a single-function electronic apparatus, in which an electronic device having a function needed for a user is selected or electronic devices are combined. Further, the electronic apparatus can be reduced in weight and volume, so that the burden on the user carrying the electronic apparatus can be reduced.

Further, it is possible to provide an electronic apparatus including a solar battery which can receive light easily even when it is difficult to receive power from a lamp line or regardless of whether the electronic apparatus is in use or not.

The liquid crystal display device in which power consumption is reduced, which is illustrated in this embodiment, and another electronic device can be coupled to the base unit regardless of the orientations of the devices. Therefore, the first electronic device and the second electronic device can be coupled to the base unit in accordance with the needs of a user even when a dominant hand of the user is right or left or even when characters are displayed on the display device vertically or horizontally, which is convenient.

(Embodiment 4)

In this embodiment, an example of a structure of a transistor including an oxide semiconductor layer, which is used for the liquid crystal display device in which power consumption is reduced, which is described in Embodiment 3, and an example of a manufacturing method of the transistor will be described in detail with reference to FIGS. 15A to 15E.

FIGS. 15A to 15E illustrate an example of a cross-sectional structure of a transistor. A transistor 510 illustrated in FIGS. 15A to 15E is an inverted staggered transistor with a bottom gate structure. However, the structure of the transistor is not limited to the above description and may have a top gate structure.

Steps of manufacturing the transistor 510 over a substrate 505 will be described below with reference to FIGS. 15A to 15E.

First, a conductive film is formed over the substrate 505 having an insulating surface, and then a gate electrode layer 511 is formed in a first photolithography step. Note that a resist mask may be formed by an inkjet method. Formation of the resist mask by an inkjet method needs no photomask; thus, the manufacturing cost can be reduced.

In this embodiment, a glass substrate is used as the substrate 505 having an insulating surface.

An insulating film which serves as a base film may be provided between the substrate 505 and the gate electrode layer 511. The base film has a function of preventing diffusion of impurity elements from the substrate 505 and can be formed to have a single-layer structure or a stacked-layer structure using a silicon nitride film, a silicon oxide film, a silicon nitride oxide film, and/or a silicon oxynitride film.

The gate electrode layer 511 can be formed to have a single-layer structure or stacked-layer structure using a metal material such as molybdenum, titanium, tantalum, tungsten, aluminum, copper, neodymium, or scandium, or an alloy which contains any of these materials as a main component.

Next, a gate insulating layer 507 is formed over the gate electrode layer 511. The gate insulating layer 507 can be formed to have a single-layer structure or a stacked-layer structure using a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer and/or a hafnium oxide layer by a plasma CVD method, a sputtering method, or the like.

As the oxide semiconductor in this embodiment, an oxide semiconductor which is made to be an i-type semiconductor or a substantially i-type semiconductor by removing impurities is used. Such a purified oxide semiconductor is highly sensitive to an interface state and interface charge; thus, an interface between the oxide semiconductor layer and the gate insulating layer is important. For that reason, the gate insulating layer that is to be in contact with a purified oxide semiconductor needs to have high quality.

For example, a high-density plasma CVD method using microwaves (e.g., a frequency of 2.45 GHz) is preferably used, in which case an insulating layer which is dense and has high withstand voltage and high quality can be formed. The purified oxide semiconductor and the high-quality gate insulating layer are in close contact with each other, whereby the interface state can be reduced and favorable interface characteristics can be obtained.

Needless to say, another film formation method such as a sputtering method or a plasma CVD method can be employed as long as the method enables formation of a high-quality insulating layer as the gate insulating layer. Further, an insulating layer whose film quality and characteristic of the interface between the insulating layer and an oxide semiconductor are improved by heat treatment which is performed after formation of the insulating layer may be formed as the gate insulating layer. In any case, any insulating layer may be formed as long as the insulating layer has characteristics of enabling a reduction in interface state density of the interface between the insulating layer and an oxide semiconductor and formation of a favorable interface as well as having favorable film quality as a gate insulating layer.

Further, in order that hydrogen, hydroxyl group, and moisture are contained as little as possible in the gate insulating layer 507 and an oxide semiconductor film 530, it is preferable that the substrate 505 over which the gate electrode layer 511 is formed or the substrate 505 over which the gate electrode layer 511 and the gate insulating layer 507 are formed be preheated in a preheating chamber of a sputtering apparatus as pretreatment for the formation of the oxide semiconductor film 530 to eliminate and remove impurities such as hydrogen and moisture adsorbed on the substrate 505. As an exhaustion unit provided in the preheating chamber, a cryopump is preferable. Note that this preheating treatment can be omitted. Further, this preheating treatment may be performed in a similar manner on the substrate 505 over which layers up to and including a source electrode layer 515a and a drain electrode layer 515b are formed before formation of an insulating layer 516.

Figure 15A:
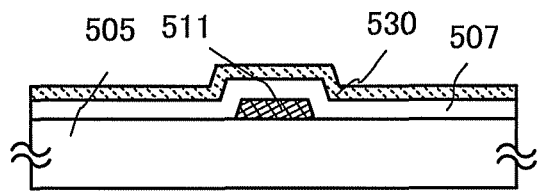
FIGS. 15A to 15E illustrate an example of a transistor including an oxide semiconductor layer and a manufacturing method thereof in accordance with an embodiment.
Figure 15B:
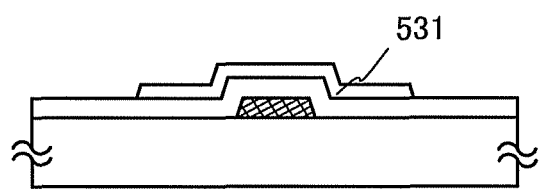

Next, the oxide semiconductor film 530 with a thickness greater than or equal to 2 nm and less than or equal to 200 nm, preferably greater than or equal to 5 nm and less than or equal to 30 nm, is formed over the gate insulating layer 507 (see FIG. 15A).

Note that before the oxide semiconductor film 530 is formed by a sputtering method, powdery substances (also referred to as particles or dust) attached to a surface of the gate insulating layer 507 are preferably removed by reverse sputtering in which plasma is generated by introduction of an argon gas. The reverse sputtering refers to a method in which an RF power supply is used for application of voltage to a substrate side in an argon atmosphere and plasma is generated around the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, the following metal oxide can be used: a four-component metal oxide such as an In—Sn—Ga—Zn—O-based oxide semiconductor; a three-component metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, a Sn—Al—Zn—O-based oxide semiconductor; a two-component metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, an In—Ga—O-based oxide semiconductor; a one-component metal oxide such as an In—O-based oxide semiconductor, a Sn—O based oxide semiconductor, a Zn—O-based oxide semiconductor; or the like. Further, $SiO_2$ may be contained in the above oxide semiconductor. Here, for example, an In—Ga—Zn—O-based oxide semiconductor means an oxide film containing indium (In), gallium (Ga), and zinc (Zn), and there is no particular limitation on the composition ratio thereof. The In—Ga—Zn—O-based oxide semiconductor may contain an element other than In, Ga, and Zn. In this embodiment, the oxide semiconductor film 530 is deposited by a sputtering method with the use of an In—Ga—Zn—O-based oxide semiconductor target. A cross-sectional view at this stage corresponds to FIG. 15A.

In the case where an In—Zn—O-based material is used as an oxide semiconductor, a target therefor has a composition ratio of In:Zn=50:1 to 1:2 in an atomic ratio ($In_2O_3$:ZnO=25:1 to 1:4 in a molar ratio), preferably, In:Zn=20:1 to 1:1 in an atomic ratio ($In_2O_3$: ZnO=10:1 to 1:2 in a molar ratio), more preferably, In:Zn=15:1 to 1.5:1 in an atomic ratio ($In_2O_3$: ZnO=15:2 to 3:4 in a molar ratio). For example, a target used for the formation of an In—Zn—O-based oxide semiconductor has an atomic ratio expressed by the equation $Z>1.5X+Y$ where In:Zn:O=X:Y:Z.

As the target for forming the oxide semiconductor film 530 by a sputtering method, for example, an oxide target having a composition ratio of $In_2O_3:Ga_2O_3:ZnO=1:1:1$ [molar ratio] is used to form an In—Ga—Zn—O film. Without limitation on the material and the component of the target, for example, an oxide target having a composition ratio of $In_2O_3:Ga_2O_3:ZnO=1:1:2$ [molar ratio] may be used.

Furthermore, the filling rate of the oxide target is 90% to 100%, and in some embodiments 95% to 99.9%. With the use of the metal oxide target with a high filling rate, a dense oxide semiconductor film can be formed.

It is preferable that a high-purity gas from which impurities such as hydrogen, water, hydroxyl group, or hydride have been removed be used as a sputtering gas used for the formation of the oxide semiconductor film 530.

The substrate is held in a deposition chamber kept under reduced pressure, and the substrate temperature is set to temperatures higher than or equal to 100° C. and lower than or equal to 600° C., preferably higher than or equal to 200° C. and lower than or equal to 400° C. By forming the oxide semiconductor film while the substrate is heated, the concentration of impurities contained in the formed oxide semiconductor film can be reduced. In addition, damage due to the sputtering can be reduced. Then, a sputtering gas from which hydrogen and moisture have been removed is introduced into the deposition chamber while moisture remaining therein is removed, and the oxide semiconductor film 530 is formed over the substrate 505 with the use of the above target. In order to remove moisture remaining in the deposition chamber, an entrapment vacuum pump such as a cryopump, an ion pump, or a titanium sublimation pump is preferably used. The evacuation unit may be a turbo pump provided with a cold trap. In the deposition chamber which is evacuated with the cryopump, a hydrogen atom, a compound containing a hydrogen atom, such as water ($H_2O$), (more preferably, also a compound containing a carbon atom), and the like are removed, whereby the concentration of impurities in the oxide semiconductor film formed in the deposition chamber can be reduced.

The atmosphere for the sputtering method may be a rare gas (typically, argon) atmosphere, an oxygen atmosphere, or a mixed atmosphere of a rare gas and oxygen.

As one example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulsed direct-current power source is preferably used, in which case powder substances (also referred to as particles or dust) that are generated in deposition can be reduced and the film thickness can be uniform.

Next, the oxide semiconductor film 530 is processed into an island-shaped oxide semiconductor layer in a second photolithography step. A resist mask for forming the island-shaped oxide semiconductor layers may be formed by an inkjet method. Formation of the resist mask by an inkjet method needs no photomask; thus, the manufacturing cost can be reduced.

In the case where a contact hole is formed in the gate insulating layer 507, a step of forming the contact hole can be performed at the same time as processing of the oxide semiconductor film 530.

Note that for the etching of the oxide semiconductor film 530, one of or both wet etching and dry etching may be employed. As an etchant used for wet etching for the oxide semiconductor film 530, for example, a mixed solution of phosphoric acid, acetic acid, and nitric acid, or the like can be used. In addition, ITO07N (produced by KANTO CHEMICAL CO., INC.) may be used.

Next, first heat treatment is performed on the oxide semiconductor layer. The oxide semiconductor layer can be dehydrated or dehydrogenated through this first heat treatment. The temperature of the first heat treatment is higher than or equal to 400° C. and lower than or equal to 750° C., preferably higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then the oxide semiconductor layer is not exposed to the air so that entry of water or hydrogen into the oxide semiconductor layer is prevented; thus, an oxide semiconductor layer 531 is obtained (see FIG. 15B).

Note that a heat treatment apparatus is not limited to an electric furnace, and a device for heating an object to be processed by heat conduction or heat radiation from a heating element such as a resistance heating element may be alternatively used. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high-temperature gas, an inert gas which does not react with an object to be processed by heat treatment, such as nitrogen or a rare gas like argon, is used.

For example, as the first heat treatment, GRTA by which the substrate is moved into an inert gas heated to a temperature as high as 650° C. to 700° C., heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to 6N (99.9999%) or higher, preferably 7N (99.99999%) or higher (i.e., the impurity concentration is 1 ppm or lower, preferably 0.1 ppm or lower).

After the oxide semiconductor layer is heated in the first heat treatment, a high-purity oxygen gas, a high-purity $N_2O$ gas, or ultra-dry air (having a dew point lower than or equal to −40° C., preferably lower than or equal to −60° C.) may be introduced into the furnace. It is preferable that water, hydrogen, and the like be not contained in an oxygen gas or an $N_2O$ gas. The purity of the oxygen gas or the $N_2O$ gas which is introduced into the heat treatment apparatus is preferably 6N or higher, more preferably 7N or higher (i.e., the concentration of impurities in the oxygen gas or the $N_2O$ gas is preferably 1 ppm or lower, more preferably 0.1 ppm or lower). Oxygen which is a main component of the oxide semiconductor and has been reduced because of the step of removing impurities through the dehydration or the dehydrogenation is supplied with the use of the effect of the oxygen gas or the $N_2O$ gas, so that the oxide semiconductor layer can be purified to be electrically i-type (intrinsic).

The first heat treatment of the oxide semiconductor layer may be performed on the oxide semiconductor film 530 which has not yet been processed into the island-shaped oxide semiconductor layer. In that case, the substrate is taken out of the heat apparatus after the first heat treatment, and then a photolithography process is performed.

Note that the first heat treatment may be performed at either of the following timings without limitation to the above timing as long as it is performed after the oxide semiconductor layer is formed: after a source electrode layer and a drain electrode layer are formed over the oxide semiconductor layer; and after an insulating layer is formed over the source electrode layer and the drain electrode layer.

Further, the step of forming the contact hole in the gate insulating layer 507 may be performed either before or after the first heat treatment is performed on the semiconductor film 530.

Alternatively, the oxide semiconductor layer may be formed through two separate film formation steps and two separate heat treatment steps. The thus formed oxide semiconductor layer has a thick crystalline region (single crystal region), that is, a crystalline region the c-axis of which is aligned in a direction perpendicular to a surface of the layer, even when any of an oxide, a nitride, a metal, and the like is used as a material for a base component. For example, a first oxide semiconductor film with a thickness greater than or equal to 3 nm and less than or equal to 15 nm is formed, and first heat treatment is performed in a nitrogen, oxygen, rare gas, or dry air atmosphere at 450° C. to 850° C., preferably 550° C. to 750° C., so that the first oxide semiconductor film has a crystalline region (including a plate-like crystal) in a region including its surface. Then, a second oxide semiconductor film which has a larger thickness than the first oxide semiconductor film is formed, and second heat treatment is performed at 450° C. to 850° C., preferably 600° C. to 700° C., so that crystal growth proceeds upward with the use of the first oxide semiconductor film as a seed of the crystal growth and the whole second oxide semiconductor film is crystallized. In such a manner, the oxide semiconductor layer having a thick crystalline region may be formed.

Next, a conductive film which serves as the source electrode layer and the drain electrode layer (including a wiring formed using the same layer as the source electrode layer and the drain electrode layer) is formed over the gate insulating layer 507 and the oxide semiconductor layer 531. As the conductive film which serves as the source electrode layer and the drain electrode layer, for example, a metal film including an element selected from Al, Cr, Cu, Ta, Ti, Mo, and W, or a metal nitride film including any of the above elements as its component (e.g., a titanium nitride film, a molybdenum nitride film, or a tungsten nitride film) can be used. Alternatively, a film of a high-melting-point metal such as Ti, Mo, or W or a metal nitride film (e.g., a titanium nitride film, a molybdenum nitride film, or a tungsten nitride film) may be formed over or/and below the metal film such as an Al film or a Cu film. In particular, a conductive film containing titanium is preferably provided on the side in contact with the oxide semiconductor layer.

Figure 15C:
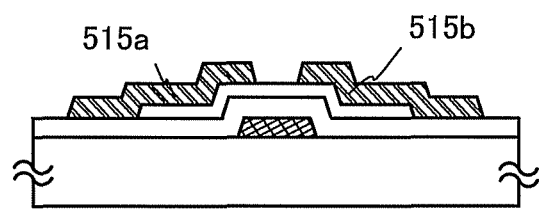

A resist mask is formed over the conductive film in a third photolithography step, and selective etching is performed to form the source electrode layer 515a and the drain electrode layer 515b, and then, the resist mask is removed (see FIG. 15C).

Light exposure at the time of the formation of the resist mask in the third photolithography step may be performed using ultraviolet light, KrF laser light, or ArF laser light. A channel length (L) of a transistor that is completed later is determined by a distance between bottom ends of the source electrode layer and the drain electrode layer, which are adjacent to each other over the oxide semiconductor layer 531. In the case where light exposure is performed for a channel length (L) of less than 25 nm, the light exposure at the time of the formation of the resist mask in the third photolithography step may be performed using extreme ultraviolet light having an extremely short wavelength of several nanometers to several tens of nanometers. In the light exposure by extreme ultraviolet light, the resolution is high and the focus depth is large. Thus, the channel length (L) of the transistor to be formed later can be greater than or equal to 10 nm and less than or equal to 1000 nm, and the circuit can operate at higher speed.

In order to reduce the number of photomasks and the number of steps in photolithography, an etching step may be performed with the use of a resist mask formed with the use of a multi-tone mask which is a light-exposure mask through which light is transmitted to have a plurality of intensities. A resist mask formed with the use of a multi-tone mask has a plurality of thicknesses and further can be changed in shape by being etched; thus, the resist mask can be used in a plurality of etching steps for forming different patterns. Thus, a resist mask corresponding to at least two kinds of different patterns can be formed by one multi-tone mask. Therefore, the number of light-exposure masks can be reduced and the number of corresponding photolithography steps can also be reduced, resulting in simplification of a process.

Note that it is preferable that etching conditions be optimized so as not to etch and divide the oxide semiconductor layer 531 when the conductive film is etched. However, it is difficult to obtain conditions under which only the conductive film is etched and the oxide semiconductor layer 531 is not etched at all. For that reason, in some cases, only part of the oxide semiconductor layer 531 is etched to be an oxide semiconductor layer having a groove (a depressed portion) at the time when the conductive film is etched.

In this embodiment, since a Ti film is used as the conductive film and an In—Ga—Zn—O-based oxide semiconductor is used for the oxide semiconductor layer 531, an ammonia hydrogen peroxide mixture (a mixed solution of ammonia, water, and a hydrogen peroxide solution) is used as an etchant.

Next, by plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 which serves as a protective insulating film in contact with part of the oxide semiconductor layer is formed without being exposed to the air.

The insulating layer 516 can be formed to a thickness of at least 1 nm by a method in which impurities such as water and hydrogen do not enter the insulating layer 516, such as a sputtering method. When hydrogen is contained in the insulating layer 516, entry of hydrogen to the oxide semiconductor layer or extraction of oxygen in the oxide semiconductor layer by hydrogen may occur, thereby causing a backchannel of the oxide semiconductor layer to have lower resistance (to be n-type), so that a parasitic channel may be formed. Therefore, it is important that a formation method in which hydrogen is not used be employed so that the insulating layer 516 contains hydrogen as little as possible.

In this embodiment, as the insulating layer 516, a silicon oxide film is formed to a thickness of 200 nm by a sputtering method. The substrate temperature in film formation may be higher than or equal to room temperature and lower than or equal to 300° C. and is 100° C. in this embodiment. The silicon oxide film can be formed by a sputtering method in a rare gas (typically, argon) atmosphere, an oxygen atmosphere, or a mixed atmosphere of a rare gas and oxygen. As a target, a silicon oxide target or a silicon target may be used. For example, the silicon oxide can be formed using a silicon target by a sputtering method in an atmosphere containing oxygen. As the insulating layer 516 which is formed in contact with the oxide semiconductor layer, an inorganic insulating film which does not contain impurities such as moisture, a hydrogen ion, and OH$^-$ and blocks the entry of these impurities from the outside is used. Typically, a silicon oxide film, a silicon oxynitride film, an aluminum oxide film, an aluminum oxynitride film, or the like is used.

As in the case of forming the oxide semiconductor film 530, an entrapment vacuum pump (e.g., a cryopump) is preferably used in order to remove moisture remaining in a deposition chamber used for forming the insulating layer 516. The insulating layer 516 is formed in a deposition chamber in which evacuation has been performed with a cryopump, whereby the concentration of impurities in the insulating layer 516 can be reduced. A turbo pump provided with a cold trap may be used as an evacuation unit for removing moisture remaining in the deposition chamber used for forming the insulating layer 516.

It is preferable that a high-purity gas from which impurities such as hydrogen, water, hydroxyl group, or hydride have been removed be used as a sputtering gas for the formation of the insulating layer 516.

Next, second heat treatment (preferably at 200° C. to 400° C., for example, at 250° C. to 350° C.) is performed in an inert gas atmosphere or an oxygen gas atmosphere. For example, the second heat treatment is performed in a nitrogen atmosphere at 250° C. for one hour. In the second heat treatment, part of the oxide semiconductor layer (a channel formation region) is heated while being in contact with the insulating layer 516.

As described above, the first heat treatment is performed on the oxide semiconductor film, whereby impurities such as hydrogen, moisture, hydroxyl group, or hydride (also referred to as a hydrogen compound) can be intentionally eliminated from the oxide semiconductor layer and oxygen, which is one of main components of the oxide semiconductor but has been reduced through the step of eliminating the impurities, can be supplied. Through the above steps, the oxide semiconductor layer is purified and is made to be an electrically i-type (intrinsic) semiconductor.

Figure 15D:
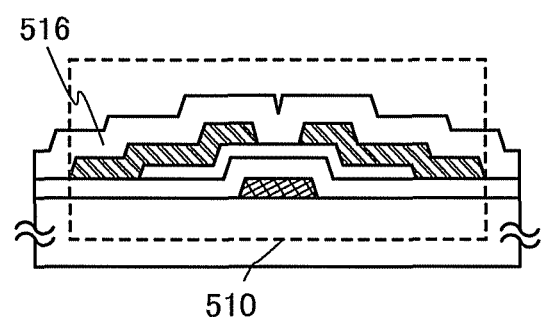
Figure 15E:
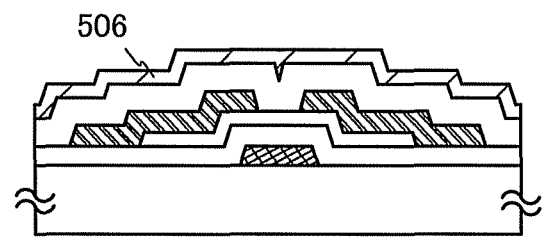

Through the above steps, the transistor 510 is formed (FIG. 15D).

When a silicon oxide layer having a lot of defects is used as the insulating layer 516, heat treatment after formation of the silicon oxide layer has an effect in diffusing impurities such as hydrogen, moisture, a hydroxyl group, or hydride contained in the oxide semiconductor layer to the oxide insulating layer so that the impurity contained in the oxide semiconductor layer can be further reduced.

A protective insulating layer 506 may be additionally formed over the insulating layer 516. As the protective insulating layer 506, for example, a silicon nitride film is formed by an RF sputtering method. An RF sputtering method has high productivity, and thus is preferably used as a formation method of the protective insulating layer. As the protective insulating layer, an inorganic insulating film which does not contain impurities such as moisture and blocks entry of the impurities from the outside is used; for example, a silicon nitride film, an aluminum nitride film, or the like is used. In this embodiment, the protective insulating layer 506 is formed using a silicon nitride film (see FIG. 15E).

In this embodiment, as the protective insulating layer 506, a silicon nitride film is formed by heating the substrate 505 over which layers up to the insulating layer 516 are formed, to a temperature of 100° C. to 400° C., introducing a sputtering gas containing high-purity nitrogen from which hydrogen and moisture are removed, and using a target of silicon semiconductor. In this step also, the protective insulating layer 506 is preferably formed while moisture remaining in the treatment chamber is removed as in the case of the formation of the insulating layer 516.

After the protective insulating layer is formed, heat treatment may be further performed at a temperature greater than or equal to 100° C. and less than or equal to 200° C. for 1 hour to 30 hours in the air. This heat treatment may be performed at a fixed heating temperature. Alternatively, the following change in the heating temperature may be conducted plural times repeatedly: the heating temperature is raised from room temperature to a temperature higher than or equal to 100° C. and lower than or equal to 200° C. and then decreased to room temperature.

The transistor described in this embodiment has high field effect mobility, so that high-speed operation is possible. Thus, when the transistor including an oxide semiconductor layer is used in a pixel portion in a liquid crystal display device, a high-quality image can be provided. In addition, by using the transistors including an oxide semiconductor layer, a driver circuit portion and a pixel portion are formed over one substrate; thus, the number of components of the liquid crystal display device can be reduced.

When the transistor including a highly purified oxide semiconductor layer is used, the current value in an off state (an off-state current value) can be further reduced. Accordingly, an electrical signal such as an image signal can be held for a longer period in the pixel, and a writing interval can be set longer. By using the method in Embodiment 3, the frequency of refresh operation can be reduced, which leads to a higher effect of suppressing power consumption.

This embodiment can be combined with any of the other embodiments in this specification as appropriate.

This application is based on Japanese Patent Application serial no. 2010-112283 filed with Japan Patent Office on May 14, 2010, the entire contents of which are hereby incorporated by reference.

What is claimed is:

1. An electronic apparatus comprising:
a first electronic device which is detachably held by a first coupler fixed to a freely rotatable first spindle;
a second electronic device which is detachably held by a second coupler fixed to a freely rotatable second spindle; and
a holder by which the freely rotatable first spindle and the freely rotatable second spindle are held,
wherein the first electronic device includes a pair of first connection terminal groups whose polarities are symmetric with respect to one rotation axis,
wherein the second electronic device includes a pair of first connection terminal groups whose polarities are symmetric with respect to one rotation axis,
wherein at least one of the first coupler and the second coupler includes a second connection terminal group connected to one of the first connection terminal groups of at least one of the first electronic device and the second electronic device, and
wherein the first electronic device and the second electronic device are electrically connected to each other through the first connection terminal groups and the second connection terminal group.

2. The electronic apparatus according to claim 1,
wherein power is supplied from one of the first electronic device and the second electronic device to the other of the first electronic device and the second electronic device through the first connection terminal groups of the first electronic device and the second electronic device and through the second connection terminal group.

3. The electronic apparatus according to claim 1,
wherein power is supplied from one of the first electronic device and the second electronic device which is provided with a solar battery, to the other of the first electronic device and the second electronic device through the first connection terminal groups of the first electronic device and the second electronic device and through the second connection terminal group.

4. An electronic apparatus comprising:
a first electronic device which is detachably held by a first coupler fixed to a freely rotatable spindle; and
a second electronic device which is detachably held by a second coupler fixed to the freely rotatable spindle;
wherein the first electronic device includes a pair of first connection terminal groups whose polarities are symmetric with respect to one rotation axis,
wherein the second electronic device includes another pair of first connection terminal groups whose polarities are symmetric with respect to another rotation axis,
wherein at least one of the first coupler and the second coupler includes a second connection terminal group connected to one of the first connection terminal groups of at least one of the first electronic device and the second electronic device, and
wherein the first electronic device and the second electronic device are electrically connected to each other through the first connection terminal groups and the second connection terminal group.

5. The electronic apparatus according to claim 4,
wherein power is supplied from one of the first electronic device and the second electronic device to the other of the first electronic device and the second electronic device through the first connection terminal groups and the second connection terminal group.

6. The electronic apparatus according to claim 4,
wherein power is supplied from one of the first electronic device and the second electronic device which is provided with a solar battery, to the other of the first electronic device and the second electronic device through the first connection terminal groups and the second connection terminal group.

7. An electronic apparatus comprising:
a first electronic device which is detachably held by a first coupler fixed to a freely rotatable first spindle;
a second electronic device which is held by a second coupler fixed to a freely rotatable second spindle; and
a holder by which the freely rotatable first spindle and the freely rotatable second spindle are held,
wherein the first electronic device includes a pair of first connection terminal groups whose polarities are symmetric with respect to one rotation axis,
wherein at least one of the first coupler and the second coupler includes a second connection terminal group connected to one of the first connection terminal groups, and
wherein the first electronic device and the second electronic device are electrically connected to each other through the first connection terminal groups and the second connection terminal group.

8. The electronic apparatus according to claim 7,
wherein power is supplied from one of the first electronic device and the second electronic device to the other of the first electronic device and the second electronic device through the first connection terminal groups and the second connection terminal group.

9. The electronic apparatus according to claim 7,
wherein power is supplied from one of the first electronic device and the second electronic device which is provided with a solar battery, to the other of the first electronic device and the second electronic device through the first connection terminal groups and the second connection terminal group.

10. An electronic apparatus comprising:
a first electronic device which is detachably held by a first coupler fixed to a freely rotatable spindle; and
a second electronic device which is held by a second coupler fixed to the freely rotatable spindle,
wherein the first electronic device includes a pair of first connection terminal groups whose polarities are symmetric with respect to one rotation axis,
wherein the first coupler includes a second connection terminal group which is electrically connected to the first electronic device, and
wherein the first electronic device and the second electronic device are electrically connected to each other through the first connection terminal groups and the second connection terminal group.

11. The electronic apparatus according to claim 10,
wherein power is supplied from one of the first electronic device and the second electronic device to the other of the first electronic device and the second electronic device through the first connection terminal groups and the second connection terminal group.

12. The electronic apparatus according to claim 10,
wherein power is supplied from one of the first electronic device and the second electronic device which is provided with a solar battery, to the other of the first electronic device and the second electronic device through the first connection terminal groups and the second connection terminal group.

13. A method of use of an electronic apparatus comprising:
a first electronic device which is detachably held by a first coupler fixed to a freely rotatable first spindle;
a second electronic device which is detachably held by a second coupler fixed to a freely rotatable second spindle; and
a holder by which the freely rotatable first spindle and the freely rotatable second spindle are held,
wherein the first electronic device includes a pair of first connection terminal groups whose polarities are symmetric with respect to one rotation axis,
wherein the second electronic device includes a pair of first connection terminal groups whose polarities are symmetric with respect to another rotation axis,
wherein at least one of the first coupler and the second coupler includes a second connection terminal group which is electrically connected to one of the first connection terminal groups of one of the first electronic device and the second electronic device,
wherein the first electronic device and the second electronic device are electrically connected to each other through the first connection terminal groups of the first electronic device and the second electronic device and through the second connection terminal group, and
wherein first surfaces of the first electronic device and the second electronic device in an open state are oriented toward a user.

14. A method of use of an electronic apparatus comprising:
a first electronic device which is detachably held by a first coupler fixed to a freely rotatable first spindle;

a second electronic device which is detachably held by a second coupler fixed to a freely rotatable second spindle; and a holder by which the freely rotatable first spindle and the freely rotatable second spindle are held, wherein the first electronic device includes a pair of first connection terminal groups whose polarities are symmetric with respect to one rotation axis, wherein the second electronic device includes a pair of first connection terminal groups whose polarities are symmetric with respect to one rotation axis, wherein at least one of the first coupler and the second coupler includes a second connection terminal group which is electrically connected to one of the first connection terminal groups of one of the first electronic device and the second electronic device, wherein the first electronic device and the second electronic device are electrically connected to each other through the first connection terminal groups and the second connection terminal group, wherein a first surface of one of the first electronic device and the second electronic device is covered with the other of the first electronic device and the second electronic device, and wherein a first surface of the other of the first electronic device and the second electronic device is oriented toward a user.

* * * * *